(12) United States Patent
Freiwald et al.

(10) Patent No.: US 6,693,255 B2
(45) Date of Patent: Feb. 17, 2004

(54) LASER ABLATION CLEANING

(75) Inventors: David A. Freiwald, Albuquerque, NM (US); Michael Youngman, Albuquerque, NM (US); Kevin Youngman, Albuquerque, NM (US)

(73) Assignee: R. F. Envirotech, Inc., Gainesville, TX (US)

(*) Notice: Subject to any disclaimer, the term of this patent is extended or adjusted under 35 U.S.C. 154(b) by 0 days.

(21) Appl. No.: 10/099,666

(22) Filed: Mar. 14, 2002

(65) Prior Publication Data

US 2002/0134770 A1 Sep. 26, 2002

Related U.S. Application Data

(60) Provisional application No. 60/292,073, filed on May 18, 2001, provisional application No. 60/290,314, filed on May 10, 2001, and provisional application No. 60/278,352, filed on Mar. 22, 2001.

(51) Int. Cl.[7] .............................................. B23K 26/36
(52) U.S. Cl. ............................................... 219/121.68
(58) Field of Search ........................ 219/121.6, 121.67, 219/121.68, 121.69, 121.72

(56) References Cited

U.S. PATENT DOCUMENTS

| | | | |
|---|---|---|---|
| 4,078,165 A | 3/1978 | Tuttle | 219/121 L |
| 4,671,848 A | 6/1987 | Miller et al. | 156/643 |
| 5,257,706 A | 11/1993 | McIntyre | 219/121.69 |
| 5,362,941 A | 11/1994 | Johnson et al. | 219/121.84 |
| 5,496,985 A | 3/1996 | Foltz et al. | 219/121.67 |
| 5,523,543 A | 6/1996 | Hunter, Jr. et al. | 219/121.62 |
| 5,562,840 A | 10/1996 | Swain et al. | 216/65 |
| 5,574,493 A | 11/1996 | Sanger et al. | 347/262 |
| 5,662,762 A | 9/1997 | Ranalli | 156/344 |
| 5,780,806 A | 7/1998 | Ferguson et al. | 219/121.68 |
| 5,986,234 A | 11/1999 | Matthews et al. | 219/121.68 |
| 6,144,010 A | 11/2000 | Tsunemi et al. | 219/121.68 |
| 6,162,218 A | 12/2000 | Elbrecht et al. | 606/4 |
| 6,288,362 B1 | 9/2001 | Thomas et al. | 219/121.84 |
| 6,444,948 B1 * | 9/2002 | Giering et al. | |
| 2002/0023903 A1 | 2/2002 | Ann Ngoi et al. | 219/121.68 |

* cited by examiner

Primary Examiner—Samuel M. Heinrich
(74) Attorney, Agent, or Firm—Rod D. Baker; Peacock, Myers & Adams, PC

(57) ABSTRACT

Laser ablation cleaning apparatus. An optical box containing mirrors for specially directing laser light, such as repeated pulsed $CO_2$ laser, is mounted in a hand-held cleaning head or in a custom work head. The hand-held cleaning head can be used to safely direct laser energy to a surface to be cleaned; the laser beam ablates from the surface coatings, corrosion, and the like without harming the substrate. The custom work head is removably mountable upon the iron core stack of a conventional commercial electric generator, and features an optics box carriage that is selectively movable along the axis of the stack to direct a laser beam into the slots of the stack for cleaning.

22 Claims, 16 Drawing Sheets

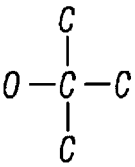

| Bond or Material | Absorption Bands (cm$^{-1}$) | Comments | Typical $CO_2$ line |
|---|---|---|---|
| $O-CH_2-O$ | 940 | Double Oxygen Bond $C-O$ stretching in higher cyclic ethers (epoxy) | $10\mu m\ P\ (24)$ |
| $O-\overset{\overset{C}{\|}}{\underset{\underset{C}{\|}}{C}}-C$ | 800-920 | $C-O$ stretching | $10\mu m\ P\ (44)$ |
| $CHR_1 = CH_2$ | 985-995 | CH out of plane deformation | $10\mu m\ P\ (46)$ |
| $CH_2-O-CH_2$ | 1060-1150 |  | $9\mu m\ R\ (22)$ |
| $C = C$ | 940-980 | Alkenese (trans) | $10\mu m\ P\ (20)$ |
| $(NO_3)$ | 800-870 |  | $10\mu m\ P\ (48)$, $^{13}C^{16}O_2$ |

| Bond | Strong Resonance cm$^{-1}$ ($\mu m$) (corresponding typical $CO_2$ line) | Number of $CO_2$ photons absorbed to break bond |
|---|---|---|
| $C-C$ | n-alkane: 837-905 (11.0-11.9) [10P(58)] 950-1150 (8.7-10.5) [10R(40)] n-propyl: 1000-1110 (9.0-10.0) [9P(20)] | 25-30 |
| $C-O-C$ | aliphatic ether: 1090-1150 (8.7-9.2) [9R(40)] | 24-27 |
| $C = C$ | alkane: radicals attached to C's 970-990 (10.1-10.3) [10R(18)] | 30-65 |
| $C-H$ | benzene: 1038 (9.634) [9P(30)] | 27-40 |

FIG. 16

LASER ABLATION CLEANING

CROSS-REFERENCE TO RELATED APPLICATIONS

This application claims the benefit of the filing of U.S. Provisional Patent Application Serial No. 60/278,352, entitled "Hand Held Laser-Ablated Material Cleaning Head," filed on Mar. 22, 2001, and U.S. Provisional Patent Application Serial No. 60/290,314, entitled "Electrical Generator Core-Iron Slot Cleaning," filed on May 10, 2001, and U.S. Provisional Patent Application Serial No. 60/292,073, entitled "Industrial Laser Ablation Process Enhancements," filed on May 18, 2001, the specifications of which are incorporated herein by reference.

BACKGROUND OF THE INVENTION

1. Field of the Invention (Technical Field)

The present invention relates to the use of directed laser energy to ablate materials from surfaces, particularly for the removal of contaminants and buildups from industrial components, especially methods and apparatus for laser ablation cleaning of commercial electrical generators.

2. Background Art

Laser ablation is not new. But all traditional ablation theories are based on a thermal-process model, delivering enough energy fast enough to take a scud coating directly to a vapor state. In the present invention, resonant energy is coupled directly into bond vibrational frequencies. For example, hydrocarbon molecules that make up linseed oil are literally torn apart by quickly forcing the vibrations between atoms making up the molecules, such as C—C, C=C, C—O, and C—H, to vibrate so violently that the bonds break. This is different from thermal-process models for laser ablation.

There commonly are many kinds of coatings such as paint, grease, oils, plasma-vapor-deposited metal, and the like on various surfaces such as metals, concrete, wood, laminates, plastics, etc. The surface is referred to as the "substrate" and the coating is referred to as the "coating." A given kind of substrate may have several different kinds/layers of coatings. A frequent need in various industries is the removal of a coating without damaging the substrate. This need arises when cleaning or rehabilitating industrial machines, equipment and structures, for instance.

There are various known ways to remove coatings. Nearly all current coating removal technologies exhibit one or more of three shortcomings: (1) they can cause damage to the substrate, (2) they do not clean out surface pores, or (3) they result in a volume of waste that is larger than the volume of removed coating material (e.g., it takes about 100 pounds of sand to remove 1 pound of aged lead-based paint by sandblasting). Further, many existing designs inject or suck air in parallel to, and from one side, of the surface being cleaned, and then evacuate it from the other side; such designs tend to leave residue ("sooting") on the target surface due to asymmetric flow.

The following references are also of interest by way of background: "Keeping Reactions Under Quantum Control," by S. Hurley & A. Castleman, *Science*, v. 292, p. 648, 27 (April 2001); "Selective Bond Dissociation and Rearrangement with Optimally Tailored, Strong-Field Laser Pulses," by R. Lewis, G. Menkir, & H. Rabitz, *Science*, v.292, p. 709, 27 (April 2001); U.S. Pat. No. 6,163,636, "Optical Communication System Using Multiple-order Raman Amplifiers".

SUMMARY OF THE INVENTION
(DISCLOSURE OF THE INVENTION)

Laser ablation cleaning apparatus. An optical box containing mirrors for specially directing laser light, such as repeated pulsed $CO_2$ laser, is mounted in a hand-held cleaning head or in a custom work head. The hand-held cleaning head can be used to safely direct laser energy to a surface to be cleaned; the laser beam ablates from the surface coatings, corrosion, and the like without harming the substrate. The custom work head is removably mountable upon the iron core stack of a conventional commercial electric generator, and features an optics box carriage that is selectively movable along the axis of the stack to direct a laser beam into the slots of the stack for cleaning.

Thus, according to the apparatus system of the invention, there is provided two types of working heads, a portable hand-held cleaning head, and a larger custom work head specially adapted for cleaning the slots in the core stacks of commercial electric generators during generator rehabilitation.

There is disclosed an apparatus for performing laser ablation cleaning of a surface, the apparatus comprising: a laser source for generating a laser beam; a beam delivery system for transmitting the beam from the source to a workhead; and a workhead, the workhead comprising: (1) an optical box having a beam entrance and a beam exit and enclosing an interior containing a first mirror and a second mirror for directing the beam from the entrance toward the surface; (2) means for positively pressurizing the interior of the optical box to induce an air stream out the beam exit; and (3) a vacuum nozzle adjacent the beam exit, the nozzle in fluid communication with a vacuum unit for providing negative pressure in the nozzle to induce an airflow through the nozzle; wherein material ablated from the surface is entrained into the airflow in the nozzle. The laser source preferably is a pulse repetition laser, and the laser beam is broad upon entrance into the optical box and the second mirror focuses the beam, whereby the energy density of the beam is increased by passage through the optical box. A baffle preferably is disposed at the exit to minimize the entry of ablated material into the optical box while permitting the transmission of the beam from the exit.

When the workhead is a hand-held cleaning head, it comprises a triggered gun housing for containing the optical box. When a custom work head is used and the surface to be cleaned is a slot in a core stack of an electrical generator, the stack having a longitudinal axis, the apparatus further comprises: an axial launch mirror for directing the laser beam from the laser source down the longitudinal axis of the core of the stack; at least one adjustable jig assembly, releasably attachable to the core iron stack, for fixing the launch mirror upon the longitudinal axis; at least one carriage rail disposable axially within the core of the stack; means for rotatably mounting the rail to the jig assembly; and a carriage, mounting the workhead including the optical box and nozzle, the carriage movable along the at least one rail for selective axial positioning of the carriage on the longitudinal axis within the core; wherein the carriage is controllably rotatable in relation to the longitudinal axis to radially the beam exit with the slot thereby to direct the laser beam toward the slot. The jig assembly preferably comprises a central hub and at least two spokes extending radially from the hub, the spokes having adjustable lengths, and the spokes of the jig assembly preferably number three uniformly spaced spokes. The jig preferably further comprises means for uniformly adjusting the lengths of the three spokes, thereby to position the axial launch mirror and the carriage on the longitudinal axis of stacks of differing diameters. The second mirror in the optics box ideally is dithered for controlled to-and-fro pivoting to clean the sides, as well as the bottom, of each slot.

The scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 16 is tables showing selected molecules in hydrocarbons, and their respective CO2 laser energy absorption characteristics.

DESCRIPTION OF THE PREFERRED EMBODIMENTS (BEST MODES FOR CARRYING OUT THE INVENTION)

The present invention is useful for the removal of coatings such as paint, rust, varnish, lacquer, and the like, or the removal of corrosion or oxidation build-up, from substrate materials such as metals, concrete, wood, certain plastics, composite materials, and glass.

The laser-ablation invention for surface cleaning results in faster, cheaper, more efficient industrial-speed cleaning. The invention also results in the reduction of certain hazardous materials to harmless molecules, reducing the amount and types of hazardous materials deposited in landfills.

In laser ablation according to one embodiment of the present invention, a laser beam is delivered via optics to an ablation-material capture/suction nozzle, or "cleaning head." The laser beam passes through the nozzle and impinges onto the surface being cleaned. The laser light causes ablation of the coating, resulting in released gases, vapors and particulates. The nozzle is attached to a vacuum hose that sucks up the ablated material. Requirements of an effective laser ablation removal system include that there be negligible amounts of material escaping out from under the edge of the nozzle, and that the nozzle be easy to clean. The special nozzle design features of the apparatus of the present invention satisfy these requirements.

A prime example of the usefulness of the invention is in electrical power generation equipment re-build projects. It is well-known in the industry that within the rotor and the stator of a generator are large copper coils that periodically must be removed, stripped of their coating materials, re-coated, and placed back into the generator. In a typical large-scale industrial generator, the coil is fashioned, for example, from nominally 0.125×1.0-inch copper strips. Before installation into the generator, each strip is wrapped in some "coating" combination of paper, glue, varnish, woven fiberglass, and epoxy. In the cleaning and rehabilitation process, all of the old coating material is removed to bare copper, the "substrate".

Laser ablation is ideal for cleaning the generator coils and other generator components during generator rehabilitation. Ablation leaves no debris behind that might cause shorts, contaminate shaft bearings, or the like. Laser light at $10.6\mu$ is well suited, since polished copper is one of the materials used to make mirrors for such laser systems. Further, the light couples well into all hydrocarbon-type materials. Thus, the laser light removes the coatings, yet reflects when it reaches bare copper.

Figure 1:
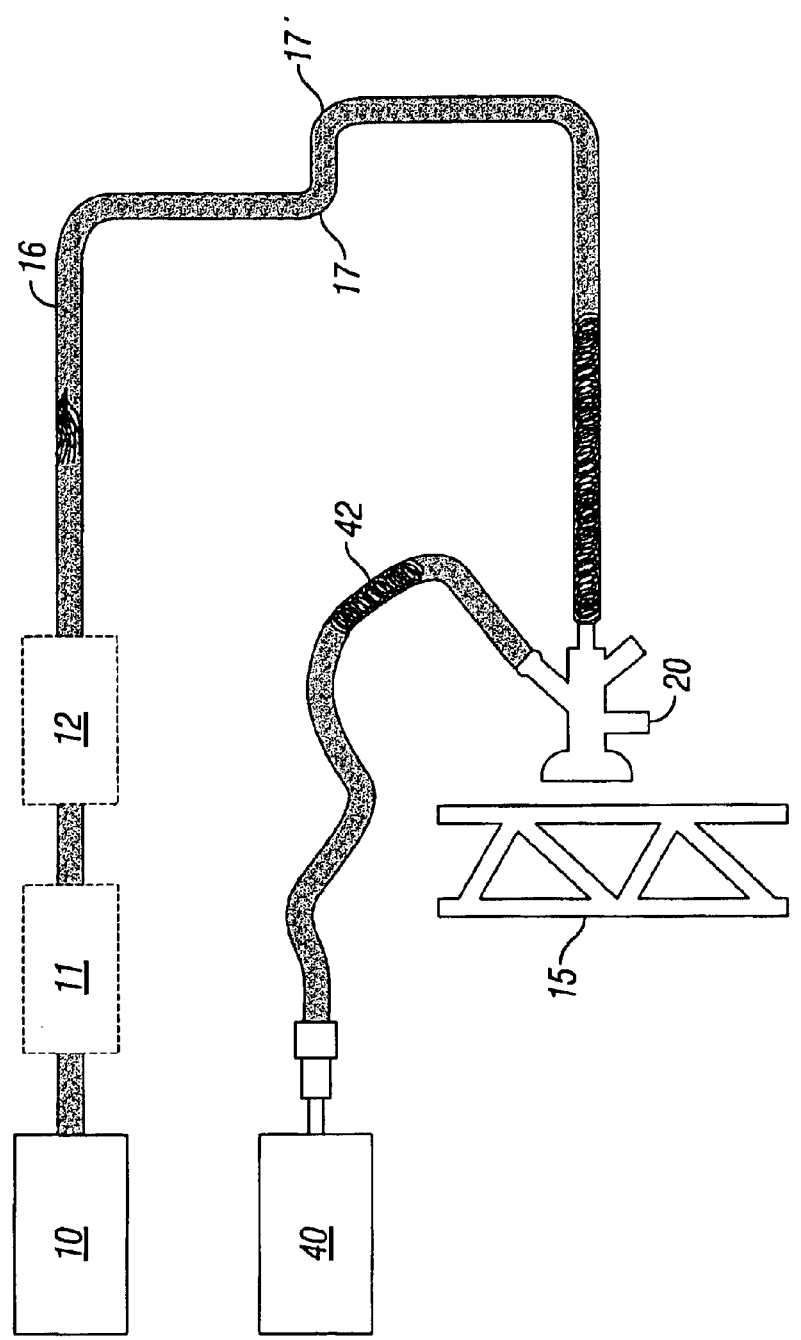
FIG. 1 is a diagrammatic view of an inventive system including a hand-held cleaning head apparatus according to the invention.

One hand-held laser ablation cleaning system according to the present invention is diagrammed in FIG. 1. A pulse repetition laser 10, preferably a $CO_2$ laser, supplies laser energy to a beam dispersion adjuster 11 and an automatic beam adjuster 12. The dispersion and beam adjusters 11, 12 are optional, as their need increases in proportion to the distance from the laser 10 to the work piece 15 to be cleaned. The laser energy is delivered to the hand-held cleaning head 20 via a rectilinear thin-wall tube 16, preferably fashioned from rigid, lightweight material, such as aluminum or composite material, whose length is application-specific (depending upon the remoteness of the laser 10 from the work piece 15). Tube 16 is articulated to provide adequate "flexibility" to permit the tube to be routed from the laser 10 to the cleaning head 20. Tube articulation is accomplished by integrating one or more swivel joints 17, 17' along the length of the tube; swivel joints 17, 17' are commercially available or within the ordinary skill in the art. Additionally, "turning" mirrors, and other articulating optics known in the art, are disposed within the tube 16, particularly in and about the swivel joints 17, 17', to direct the laser beam along the length of the articulated tube 16 to the point of use.

Material and vapor ablated from the work piece 15 is removed from the vicinity of the cleaning head 20 by means of a powered vacuum and filtration unit 40. The vacuum unit 40 is equipped with a conventional blower to create reverse pressure in the flex vacuum hose 42. Flex vacuum hose 42 is in fluid communication between the vacuum filtration unit 40 and the cleaning head 20, so that ablated particulates and vapors are sucked from the head 20 to the unit 40, where filtration of the air stream is accomplished.

A central component of the inventive system is the hand-held cleaning head 20, seen in FIG. 1. A cleaning head according to the invention satisfies twelve design criteria that fall into three categories:

Flow: (1) The cleaning head must permit some ambient air to enter the nozzle, in order to cool the ablated material and dilute and entrain the ablated material for easier filtration. (2) There preferably are no flow restrictions such as tight elbows or cross-section restrictions; vacuum flow rate from under the edge of the cleaning head to the filtration unit is maximized. (3) The vacuum preferably is straight up from surface, especially with lower vacuum flow rates. (4) The nozzle's base radius is sufficient to allow microblasts to decay or dissipate, such that incoming airflow can entrain the ablate material.

Contamination: (5) The cleaning head avoids direct contact of the nozzle with contaminated surfaces, or delicate surfaces where the material is being cleaned for re-use, so not to damage the surface and to avoid unnecessary contamination of the nozzle. (6) The nozzle and vacuum lines are easy to clean. Alternatively, if the nozzle and/or vacuum lines not easy to clean or decontaminate, they are manufactured to be rugged, but inexpensive and disposable (preferably crushable for waste-volume reduction).

Optics: (7) The cleaning laser beam is as near perpendicular to the surface as possible. (The more off-axis tilt the beam has, then the more chance there is for shadowing in pores, and the less chance that the tail of the laser pulse will thermally process the plume. The plasma plume explodes perpendicular to the surface.) (8) For high-power lasers, reflective (rather than pass-through) optics preferably are used. (9) The optics are configured so that the beam diverges at the surface, reducing eye hazards in the event of beam "leakage" from under the edge of the nozzle. (10) The optics are "clean", with acoustic (shock wave) baffling to keep the microblasts from entering the nozzle optics box, and with the airflow out from optical box into the ablated-material capture-nozzle cavity. (11) For non-circular laser beams, mirror and acoustic baffle sized for beam rotation from an articulating beam delivery system, if an articulating beam delivery system is used. (12) Angles to and from concave or convex lenses within the nozzle optics box are minimized, preferably less than approximately 23°. The present invention satisfies the foregoing criteria, particularly criteria 3–7 and 9–11 that normally are unmet by existing devices.

Reference is made to FIGS. 2A, 2B, 3A and 3B showing a cleaning head 20 according to one embodiment of the invention. In these figures, straight-line directional arrows are indicative of the path of the laser light beam through the apparatus; wavy directional arrows indicate an air flow. The portable, hand-held cleaning head 20 includes two principal components, namely the ablated-material capture and flow assembly 21, and the optics assembly 22 that transmits the laser beam into the apparatus and directs it to the targeted surface. The cleaning head 20 includes a triggered gun housing 49 which contains the optics assembly 22 and optical box 51 to protect them and serve as means of manipulation and triggered control.

Figure 4:
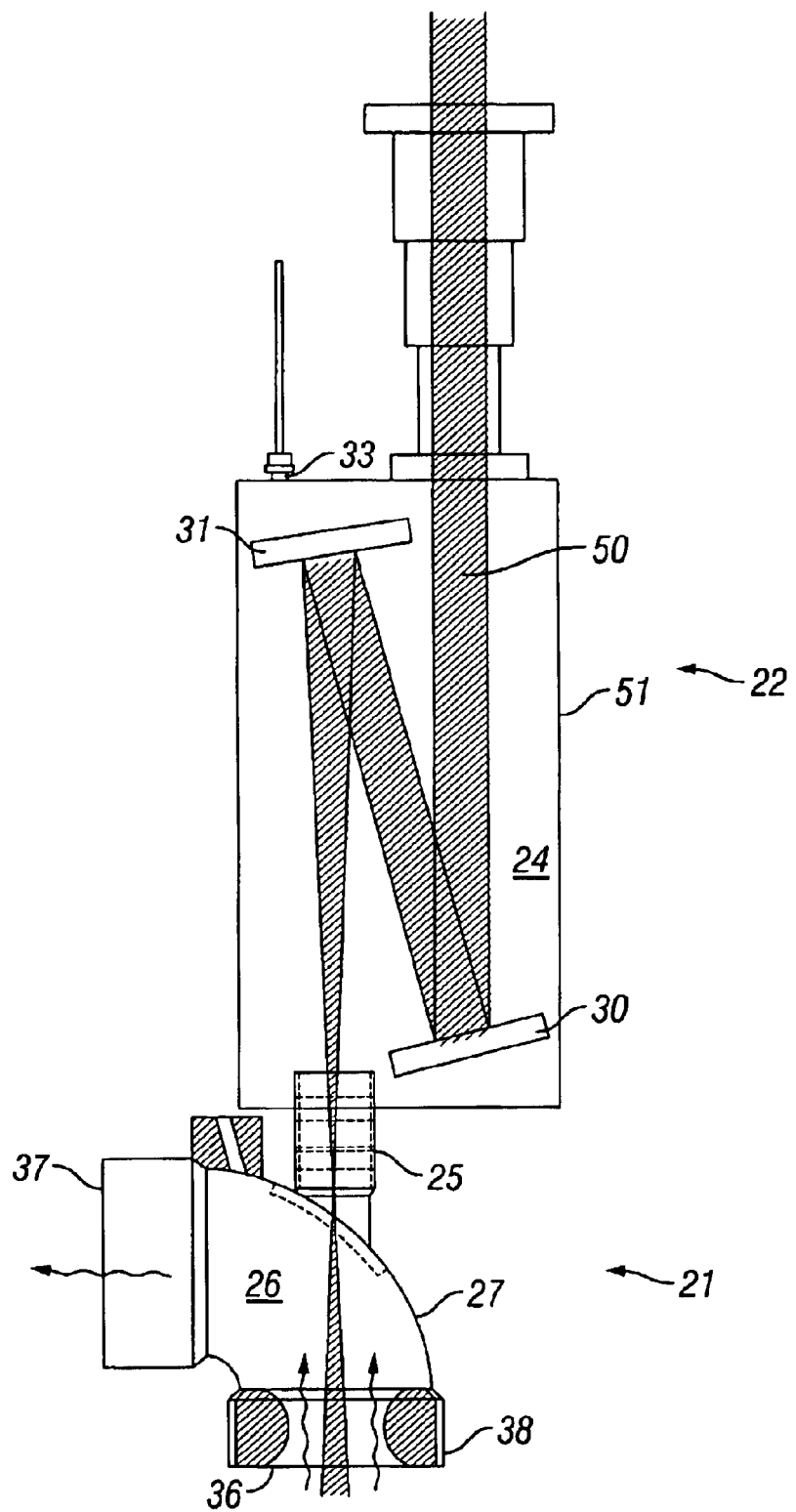
FIG. 4 is a side sectional view of the optics box according to the present invention, which may be used in various embodiments of the apparatus of the invention.

Added reference is made to FIG. 4. An airflow is maintained from the optical cavity 24 through the baffle stack 25 and into the capture chamber 26 to preserve a positive pressure in the cavity 24. Positive air pressure in the optical cavity 24 prevents ablated material and vapor from blowing back against the optical elements 30, 31 (e.g. copper-coated mirrors). The airflow is maintained by a combination vacuum suction (from vacuum filtration unit 40) and clean gas injection (e.g. via injection port 33) into the optical cavity 24. The airflow accordingly minimizes contamination of the mirrors 30, 31, and maintains the cleanliness of the optics.

The laser beam is admitted into the optics box 51 via an entrance, as is directed toward the surface of the work piece via an exit, as seen in FIG. 4. Advantageously, the mirrors 30, 31 are fashioned so as to receive and direct a broad laser beam, with the final laser 31 serving to focus the beam for final use in ablation. Thus, the apparatus of the invention offers a comparatively long life for the optical components, as the laser energy density is maintained at a lower level while being delivered through the system, not being focused to high density until directed at the work piece surface to be cleaned, where concentrated density is desired.

The material capture chamber 26 preferably is defined by a generally circular or conical shaped nozzle 27. The nozzle 27 has an ingress aperture 36 with a radius sufficiently large to substantially enclose the ablation site and thus permit mitigation of the hemispherical microblast. In use, the nozzle 27 rides a few millimeters above the surface S being cleaned (FIG. 3B). An active standoff sensor and feedback/control system (not shown) of any suitable known construction may be used to maintain the proper standoff distance from the surface S.

Figure 2A:
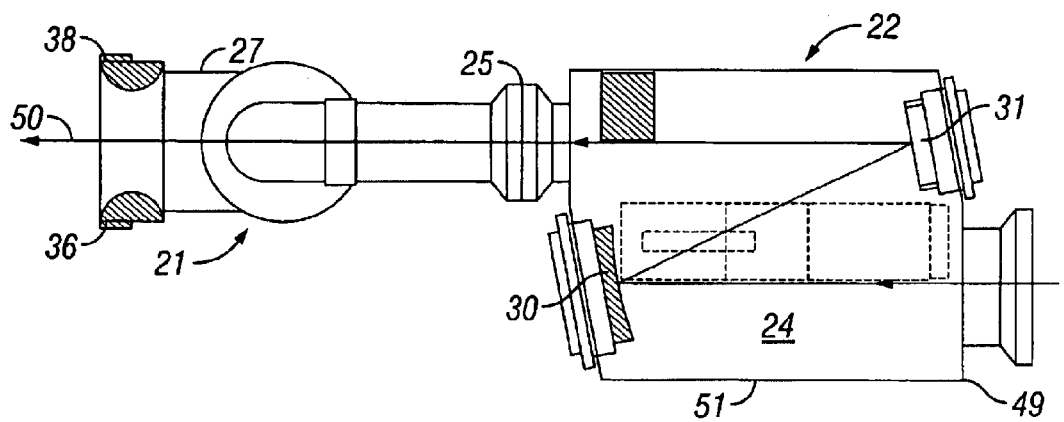
FIGS. 2A and 2B are top and side sectional views, respectively, of one embodiment of the hand-held cleaning head according to the present invention.
Figure 2B:
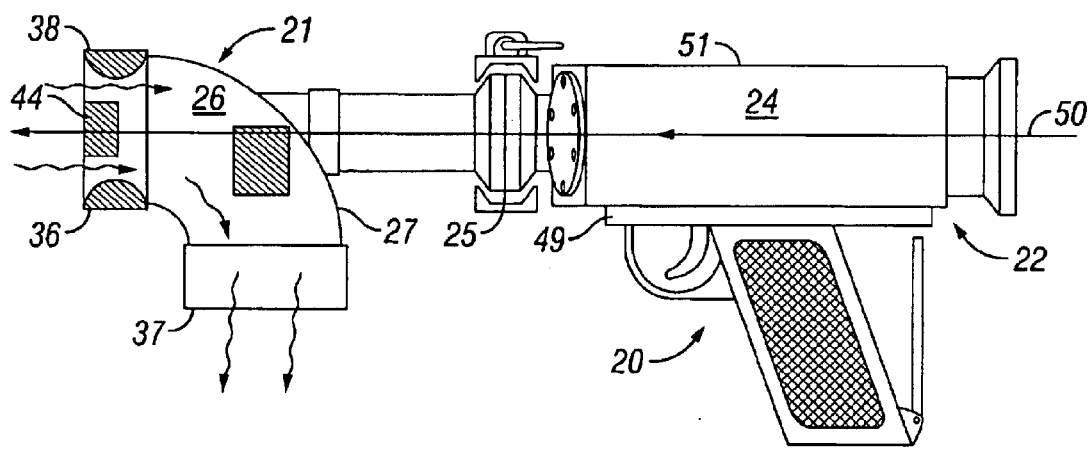

Ablated material is diluted and partially cooled by the air stream flowing into the capture chamber 26 from the baffle stack 25 and from under the rim 38 of the nozzle 27 (the latter flow stream induced by the suction of the vacuum filter unit 40 through the vacuum flex hose 42) as suggested by the wavy directional arrows of FIGS. 2B and 3B. Additional vents optionally may be provided in the sides of the nozzle 27 to permit more air in-flow as needed. The mixture of air and ablated material is then removed from the capture chamber 26 by suction through the egress port 37, which is in fluid connection with vacuum hose 42, and then on into filtration unit 40 (FIG. 1.) Alternative embodiments of the inventive apparatus incorporate an optional divertor ring 44 around and within the orifice of the ingress aperture 36 of the nozzle 27. The divertor ring 44 diverts some of the air sucked past the rim 38 through the aperture 36 to flow rapidly past the inside surface of the nozzle 27, preventing the accumulation thereon of contaminated material from the laser-induced micro-explosions, and to maintain a laminar boundary layer across that surface.

Particular reference is made to FIG. 4. The laser beam 50 enters the optics box 51 (e.g., from delivery tube 16, FIG. 1), where it impinges upon first mirror 30 that bounces the beam across the optical cavity 24 (enclosed by box 51) to a second mirror 31. The second mirror 31 is a parabolic mirror that focuses the beam 50 through the baffle stack 25, into the capture cavity 26, and on to the targeted surface. Notable, and as illustrated by FIG. 4, the focal point of the second mirror 31 is in the stack 25, so that the beam 50 expands as it emerges from the stack 25. For very high power laser beams, a line focus within the stack 25 is preferable to a point focus, since focusing to a point may cause air within the stack 25 to ionize. The line-focus geometry offers comparatively lower power density, minimizing air breakdown.

With the laser beam expanding after passing through the stack 25, it is directed onto the target surface S (FIG. 3B), e.g. the surface of the work piece 15 (FIG. 1). The expansion is constrained as not to severely compromise the power density of the beam 50 for cleaning purposes. If, however, for any reason a fraction of the beam 50 should reflect from the target surface S and "leak" out from under the rim 38 of the nozzle 27, the beam leakage will be constantly decreasing in power density, via expansion, as it propagates outward. This feature advantageously adds a degree of laser eye safety to the system for operators or observers.

As mentioned, the cavity 24 within optics box 51 preferably is maintained at a slightly higher pressure of dry air or nitrogen, relative to the pressure in the capture chamber 26 of the flow nozzle 27. This pressure differential minimizes contamination of the mirrors 30, 31 by any debris that otherwise might leak into the optics box 51 through the baffle stack 25.

Figure 3A:
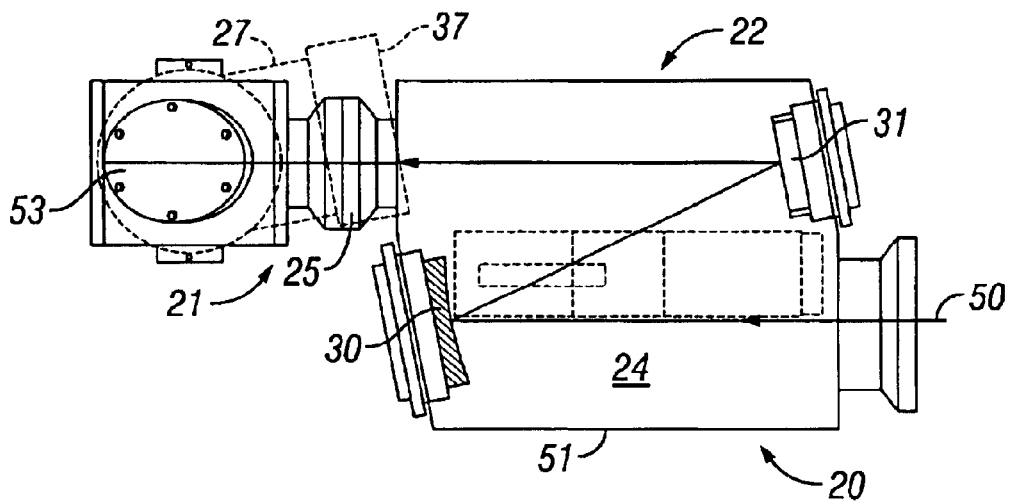
FIGS. 3A and 3B are top and side sectional views, respectively, of another embodiment of the hand-held cleaning head according to the present invention.
Figure 3B:
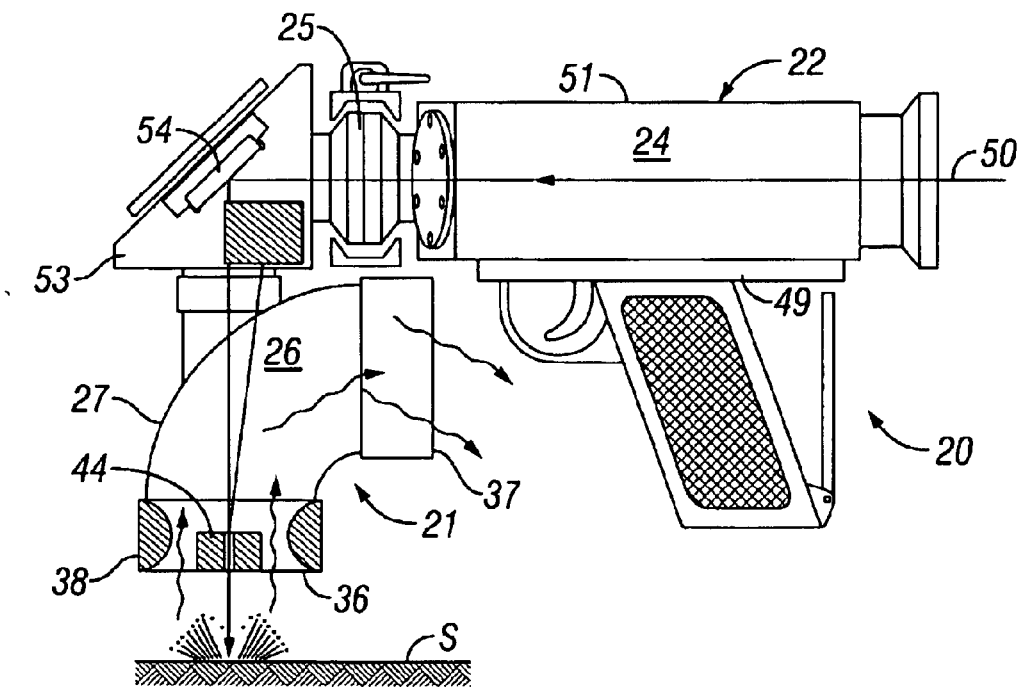

FIGS. 3A and 3B show the presence of an optional swivel connector 53 between the flow assembly 21 and the optics assembly 22, to permit the flow assembly to be rotatable 360 degrees in relation to the optics assembly 22 to which the handle and trigger are attached. This swiveling permits the user latitude of positional adjustability of the nozzle 27, in relation to the surface S and especially the optics assembly 22, during cleaning operations. The swivel connector may include within a swivel turning mirror 54 that turns the beam 50 to direct through the ingress aperture 36 regardless of the positional relationship of the nozzle 27 relative to the optics assembly 22.

Figure 5:
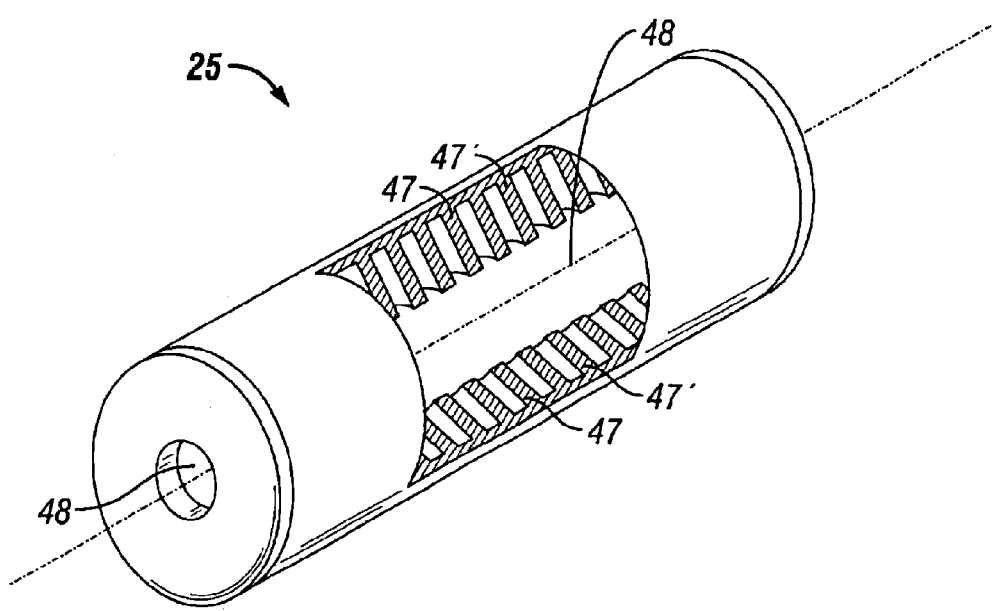
FIG. 5 is an enlarged perspective view of the protective baffle component of the invention, with a portion cut away to reveal certain internal features.

FIG. 5 shows a simple configuration for the baffle 25. Baffle 25 has a parallel series of annular baffle plates 47, 47' (varying number, depending upon application) maintained in spaced relation. The plates 47, 47', each penetrated by a central aperture, collectively define a central, axial baffle channel 48 there through. The baffle channel 48 permits the outward transmission of the laser beam 50, while the arrangement of plates 47, 47' arrests the backwash of ablated debris through the baffle 25 toward the optical cavity 24.

The cleaning head 20 avoids direct contact of the nozzle 27 with contaminated or delicate surfaces. Some ambient air is permitted to enter the nozzle 27 in order to cool the ablated material and to dilute and entrain the ablated material for easier filtration. It is noted that in specialized applications, it may be desirable to keep certain ablated substances, such as uranium oxide, above their dew point until immediately prior to filtration. In instances where elevated temperatures may be desirable, the task can be accomplished with some combination of regulating incoming ambient air, injecting hot air into the optics box 51, and/or imbedding heating coils in the nozzle 27 and/or delivery hose 42 to the filtration unit 40.

The inventive head 20 desirably incorporates no flow restrictions, such as tight elbows or cross-section restrictions, thereby maximizing vacuum flow rate to the filtration unit 40. Further, the vacuum flow is substantially perpendicular away from the treated surface S, especially with lower vacuum flow rates. With high flow rates and high dilution ratios, such perpendicular flow may not be critical, since ablated material is fully entrained early in the flow stream. Microblasts from pulsed laser ablation tend to expand perpendicular to the treated surface, however, so the inventive design enables easy entrainment of the ablated material by advantageously "coordinating" microblasting expansion with the air flow. Notably, the ingress aperture 36 radius and overall geometry of the nozzle 27 permit microblast effects and debris to decay and disperse, such that incoming airflow can entrain the ablated material.

The nozzle 27 and vacuum line 42 are easy to clean. The optical cavity 24 is protected with clean gas flow through the cavity 24 and on into the capture chamber 26. Preferably, the optical cavity 24 is detachable from the capture chamber 26. The capture chamber 26 has simple geometry, preferably a generally hemispherical bell or cone, transitioning into a generally cylindrical, tubular portion connectable to the vacuum hose 42. A lower portion of the nozzle 27 optionally may be removable from an upper portion, and/or the capture chamber 26 optionally may be fitted with disposable slip liners on which contaminants may be collected. Nevertheless, a nozzle having a take-apart design enables easy decontamination, even without the use of wall slip liners.

For high-power lasers, reflective optics, i.e. mirrors 30, 31 are employed, which can be water cooled if required. The inventive apparatus employs "clean" optics, with airflow out from optical cavity 24 into the ablated-material capture cavity 26. For non-circular laser beams, mirror sizes permit beam rotation from an articulating beam delivery system, while angles to and from concave lenses are minimized.

In a humid environment, the nozzle 27 and vacuum hose 42 may be fabricated of thermal conducting material and heated with wall heaters or hot air injection to keep certain oxides above their dew point until they reach the filtration unit 40. Also, inject inert gas, such as helium or argon, may be injected into the capture chamber 26 to inhibit chemical reactions in the flow and vacuum line 42 until the flow reaches the filtration unit 40, similar to the process used in inert-gas welding to prevent formation of oxides in undesirable locations.

Laser ablation is ideal for cleaning generator coils and other generator components during generator rehabilitation. This inventive apparatus advantageously permits the capture of ablated material with negligible release of such material to the environment. This feature is practically essential for radioactive or hazardous materials, and promotes compliance with OSHA and EPA requirements for a wide variety of other substances as well.

The foregoing described embodiment of the invention pertains to a hand-held cleaning head that is useful for cleaning relatively broad and easily accessed surfaces. An alternative embodiment has application in the cleaning of deep slots in equipment and structural components, particularly the iron-core stacks in electrical generators. In commercial electric-power generators, there are steam-driven turbines, to which steam from a boiler in an adjacent room or building is delivered via large pipes. The steam may originate from any conventionally heated primary loop. The turbine alternatively may be a gas turbine running on natural gas. The turbine is connected via a drive shaft to the electrical generator inside a structure commonly called a "clam shell." The electrical generator unit is inside the clamshell.

The stationary stator of a conventional generator is fashioned from an array of core-iron and copper bars and plates. Several plates define a complete circle, and hundreds of plate circles are stacked to comprise a cylindrical core iron, or "stack," which typically is about 20 feet long. These core irons in practice may occur in a variety of sizes, depending upon the size (rating, kW) of the generator. In an ordinary generator, slots in the core iron plates are aligned when the core iron is stacked, so that long slots run the length of the assembled core-iron stack. These slots can vary in size depending upon the particular generator design, but are normally about one inch wide, about eight and one-half inches deep, and about fourteen to about thirty or more feet long (depending upon the length of the stack). Disposed into the slots of a functional stack are copper bars that run the length of the stack, which bars typically include channels for coolant flow.

The present invention offers an apparatus and method for cleaning the core-iron stack of typical known configuration as just described. When it becomes necessary top clean the stack, the bars are removed from the slots. A particular unmet need in the power industry is the need to clean the slots in the core-iron stacks, which are not removed from the stator or disassembled for refurbishment or rebuild; the stacks must be cleaned in situ. Cleaning the interior surfaces of the stack slots with known devices and methods is difficult; the task currently normally is attempted using mechanical dry ice "bead" blasting device. Known methods suffer from the need for elaborate preparation, including the need to erect tenting to contain cleaning byproducts. Further, the dry ice bead blasting method can be slow, and the workers must wear "Level A" dress since the dry ice sublimates to carbon dioxide upon impact with the surface to be cleaned. Alternative mechanical cleaning methods are disfavored due to the potential for damage to the core-iron sheets.

With this invention, the need for elaborate pre-cleaning site preparation and the risk of physical damage to the stack are eliminated, and the entire cleaning process is completed more quickly. The cleaning of the stack can be accomplished faster and cheaper, especially allowing the generator to go back on-line faster, thus reducing costly "downtime."

Figure 6:
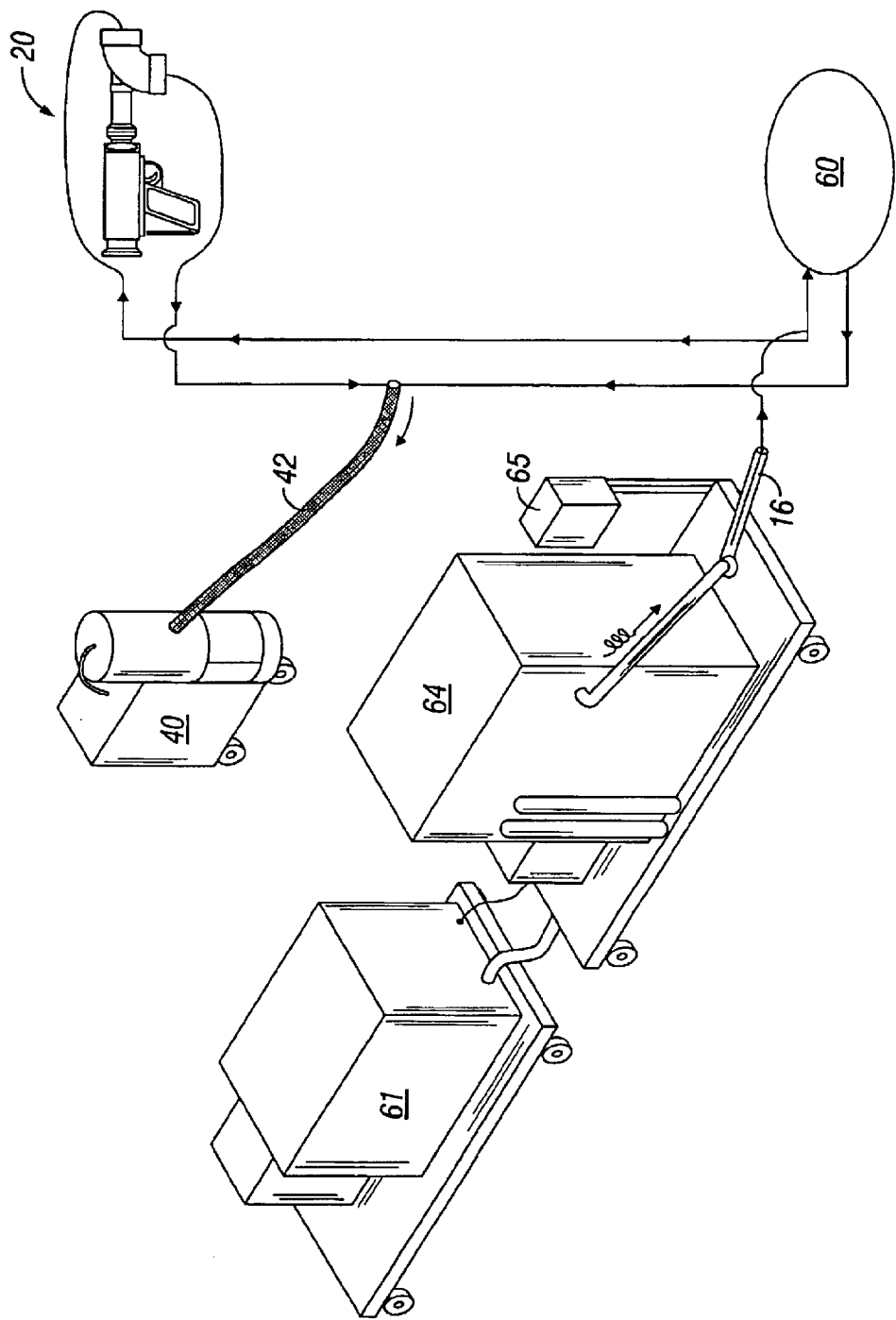
FIG. 6 is a diagrammatic view of another inventive system including a custom work head apparatus according to the invention.

According to this alternative embodiment of the invention, there is provided a modular, mobile system that can be transported into the turbine-generator hall of a power plant. For stator slot cleaning, a custom work head 60 diagrammatically portrayed in FIG. 6 is provided. FIG. 6 illustrates that a single system according to the invention may support the hand held cleaning head 20 (FIG. 2A through FIG. 4) as well as the custom work head 60 adapted for cleaning core-iron stack slots. The system may include a portable, cart-mounted chiller module 61 including a chiller and a source of compressed air, for cooling the laser and laser optics. The laser, preferably a $CO_2$ laser, and its associated transformer, as well as system controls 65, also are contained upon a portable, cart-mounted laser module 64. One or more articulated laser beam delivery tubes 16, as previously described (FIG. 1) are in operative connection with the custom work head 60 and/or the hand-held cleaning head 20 to provide beam energy thereto. (The cleaning head 20 and custom work head 60 can both be characterized as a type of "work head", and may be used separately and alone in a given system, or a system may be adapted to permit the simultaneous use of both types of work heads.) A cart-mounted vacuum and filtration unit 40 is provided, with vacuum hose 42 to provide suction from the custom work head 60 and/or a hand-held cleaning head 20. Both the laser module 64 and the vacuum filtration unit 40 are located as close as practicable to the work piece, such as the open end of a generator stator, to be cleaned.

Figure 7:
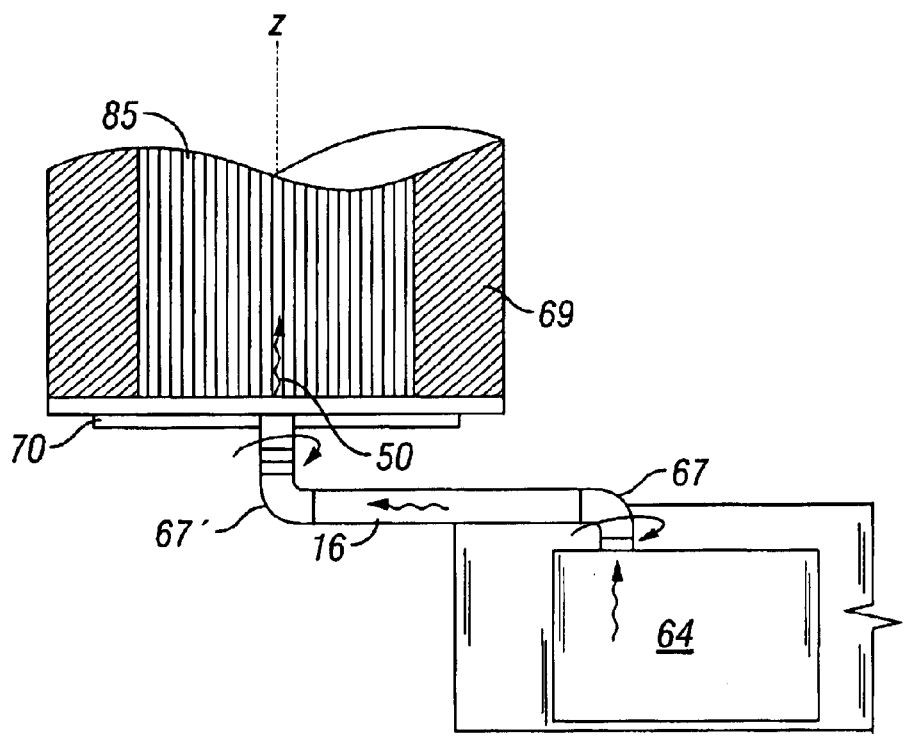
FIG. 7 is a top view, in partial section, of the custom work head according to the present invention, shown attached to an electric generator iron core stack for cleaning the stack.
Figure 8:
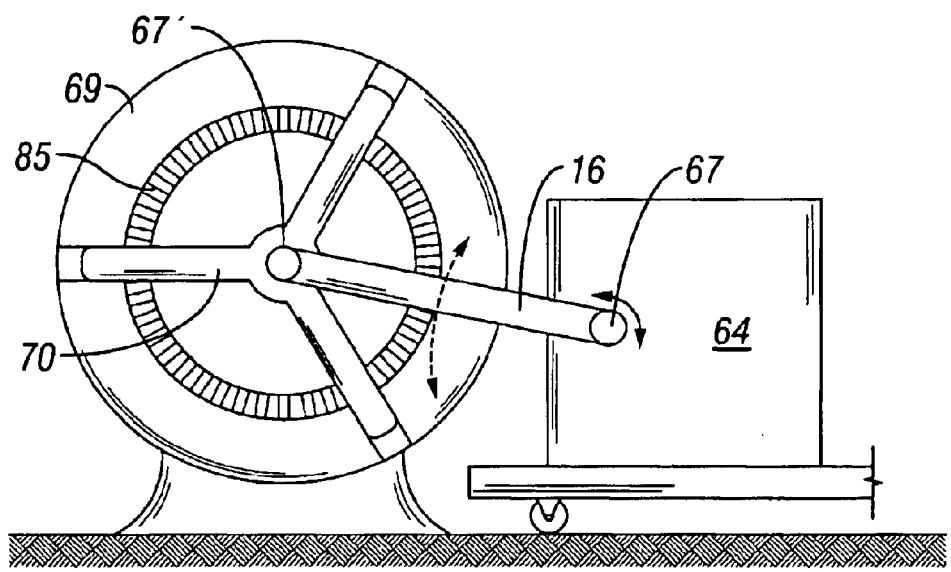
FIG. 8 is an elevation view of the apparatus shown in FIG. 7.

Reference is made to FIGS. 7 and 8, illustrating the use of the alternative embodiment in the cleaning of the slots 85 of a core iron 69 of a generator stator. The laser beam is transmitted from the laser output of the laser module 64 by the articulating beam delivery tube 16 (which may incorporate a plurality of articulating 90-degree "knuckles" 67, 67' or swivel joints incorporating turning mirrors). The delivery tube 16 allows the laser beam to be directed down the longitudinal center axis Z (Z-axis) of the stack 69. As suggested by the directional arrows in FIGS. 7 and 8, optical articulating knuckles of known construction can be integrated into the delivery tube 16 if needed to accommodate difficult or complex relative positions between the inventive apparatus and the longitudinal axis Z of the iron core stack 69. As seen in FIG. 7 the beam 50 exits the laser module 64 directly into a rotatable 90-degree knuckle 67, and is then transmitted to a second rotating 90-degree knuckle 67' located on the center axis Z of the core-iron stack 69. The second, (or final in a series) rotating knuckle 67', including an axial launch mirror 62, directs the beam down the axis Z of the core-iron stack 69. The incorporation of two rotating optical knuckles 67, 67' permits a single system to accommodate core irons of different sizes and axis heights above floor level.

Figure 9A:
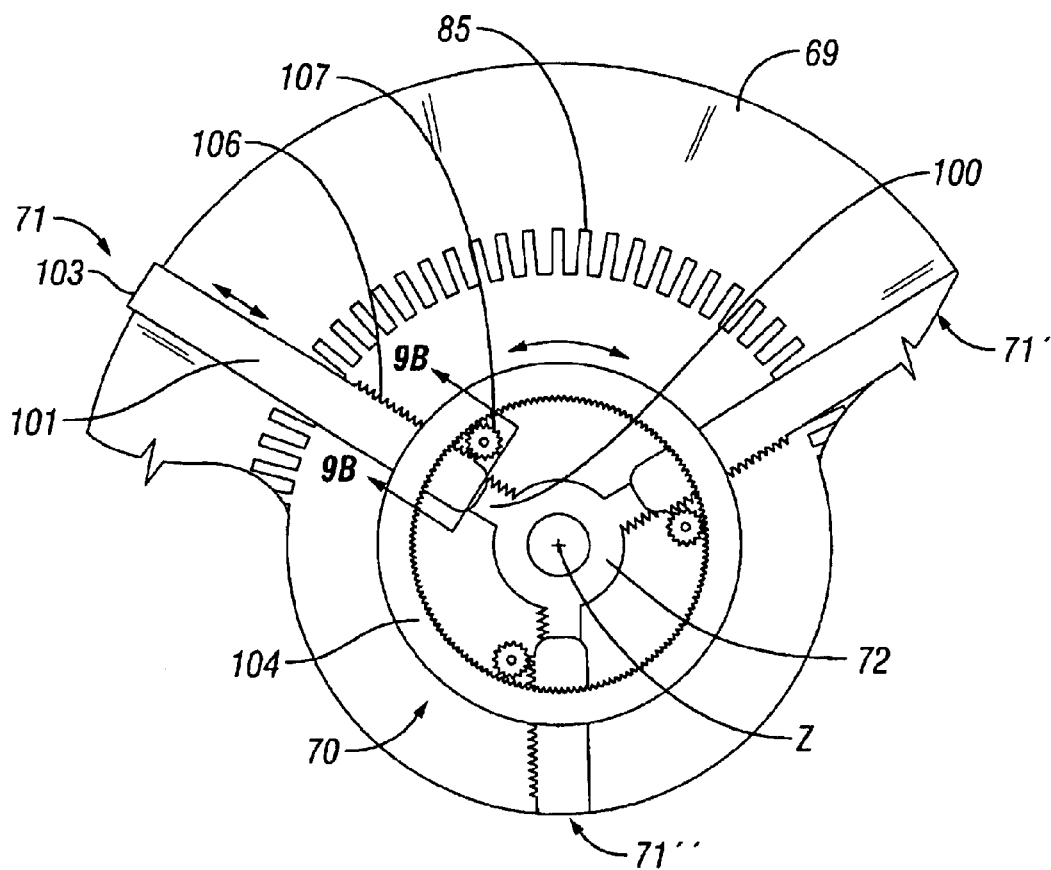
FIG. 9A is a partial, enlarged, end view of one embodiment of the custom cleaning head the jig components of the apparatus shown in FIG. 8.
Figure 9B:
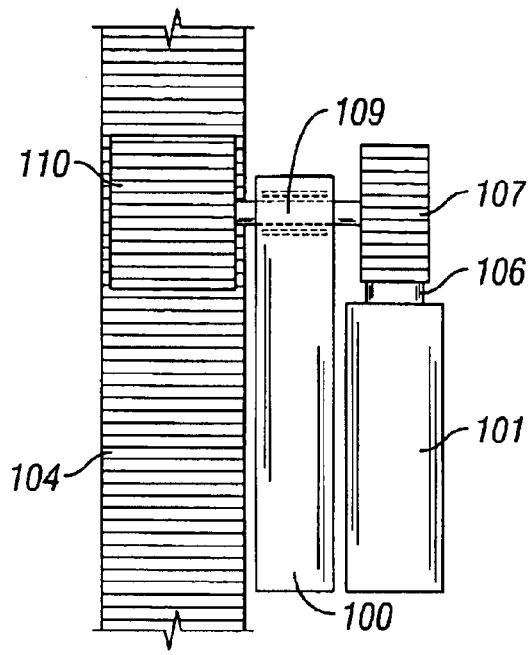
FIG. 9B is an enlarged sectional view of a portion of the apparatus shown in FIG. 9A, taken along line B—B in FIG. 9A.

Particular reference is made to FIGS. 9A and 9B, illustrating one of the invention's adjustable centering chucks or jigs 70. Jigs 70 are adjustably attachable to the stator so as to be symmetrically disposed about the axis Z of the stack 69. A first jig 70 supports and releasably fixes the final 90-degree mirror knuckle 67' at a point on the stack axis Z. Disposition of the final knuckle 67', with its axial launch mirror therein, permits controlled delivery of the beam substantially collinear along the center axis Z of the core-iron stack 69 (i.e., the beam is "aimed" down the axis Z). Also, the jig 70 supports the proximate end of a carriage assembly, to be described, for moving an optics box axially along the stack 69. The jig 70 may be constructed in any of a variety of suitable configurations, and is removably attachable to the proximate end of the stack 69 in any suitable manner. A second, substantially identical jig (not shown) is removably attached to the other, distal, end of the stack 69 for supporting the distal end of the carriage assembly. Description of one jig 70 serves to describe both jigs.

As seen in FIGS. 9A and 9B, the jig 70 may be compared, for purposes of brief description, to a large three-dog selfcentering lathe chucks with a style of planetary gear arrangement. The jig has a central hub 72 that is in a centrally fixed position during operation of the apparatus. Adjustable supporting spokes 71, 71', 71" (at least two, preferably three or four) extend radially outward from hub 72. Description of one spoke 71 serves to describe each spoke in the plurality. Spokes 71,71', 71" are uniformly spaced radial array around the jig hub 72. Each spoke 71 has a base segment 100 in fixed connection with the hub 72 and extending therefrom. A movable segment 101 has a sliding connection flush against the base segment 100. The movable segment 101 is movable in one dimension, radially inward and outward along the radius defined by the base segment 100, so that the overall length of the spoke 71 is adjustable. As the movable segment 101 moves in and out, the distance from the central axis Z to the radially distal end 103 of the movable segment changes, thereby permitting the overall length of each spoke 71 to be controllably adjusted to accommodate stators of differing diameters; the distal end of each movable segment 101 is engageable with the outer surface of the stator or stack 69, or alternatively the inner slotted surface of the stack.

Consistent, controlled simultaneous movement of all movable segments 101 is accomplished through the use of a ring gear 104 rotatably mounted on the jig 70 in any suitable manner so as to revolve around the axis Z. Again, it is noted that a description of the configuration and operation of any one spoke 71 describes the operation of each of the spokes 71', 71". Combined reference is made to FIGS. 9A and 9B. Each movable segment 101 features along one edge thereof a rack of gear teeth 106 engaged with the teeth of a rotatable pinion gear 107. Pinion gear 107 is fixed to one end of a shaft 109, the shaft being roller bearing mounted through the adjacent immovable base segment 100 so as to rotate in relation thereto. With particular attention to FIG. 9B, it is seen that fixed on the other end of the rotatable shaft 109 is a drive gear 110, whose teeth mesh with the teeth of the ring gear 104. The ring gear 104 thus is in operative engagement with the drive gear 110, so that rotation of the ring gear 104 causes the drive gear 110 to rotate. Rotary motion of the drive gear 110 is transmitted by shaft 109 to the pinion gear 107. Since the teeth of the pinion gear 107 mesh with the teeth of the rack 106 on the movable segment 101, rotary motion of the pinion gear 107 is converted to radial linear motion of the movable segment 101, as indicated by the directional arrows in FIG. 9A.

It is seen, therefore, that in the practice of the invention, controlled powered revolution of the ring gear 104, by any suitable drive means, will result in the rotation of the various drive gears 110 journaled on each of the various base segments 100 of the plurality of radially arrayed spokes 71, 71', 71". The various drive gears 110 all rotate at the same speed, causing all the pinion gears 107 also to rotate at the same angular velocity on the shafts 109. The mutually consistent rotational speeds of the pinion gears 107 results in the sliding extension or retraction of the movable segments 101 at uniform rates. Whether the movable segments 101 are retracted or extended depends upon the direction of revolution of the ring gear 104. Controlled revolution of the ring gear 104, therefore, permits the operator to increase or decrease the effective lengths of the spokes 71, 71', 71" in a mutually consistent manner, to maintain the symmetry of the spokes about the axis Z to locate the center of the jig hub 72 precisely on the axis Z of the stack 69. The complete jig 70, however, is rotatable about the axis Z to allow the circumferential positions of the spokes 71, 71', 71" to be adjusted for optimal placement on the stator or stack.

Figure 10B:
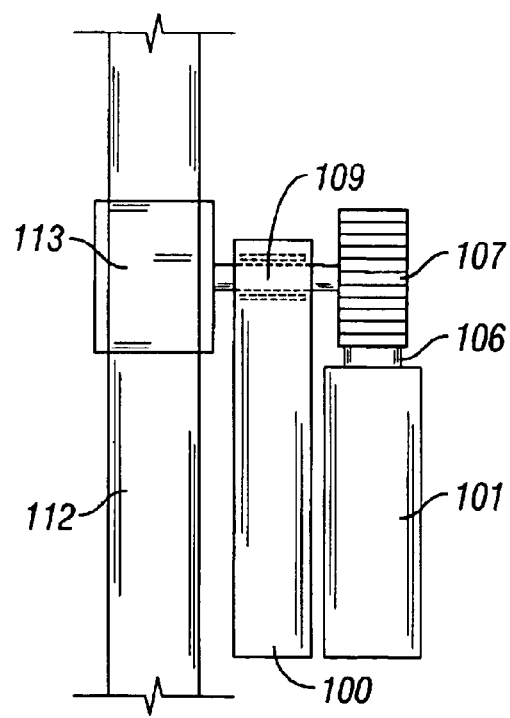
FIG. 10B is an enlarged sectional view of a portion of the apparatus shown in FIG. 10A, taken along line B—B in FIG. 10A.
Figure 10A:
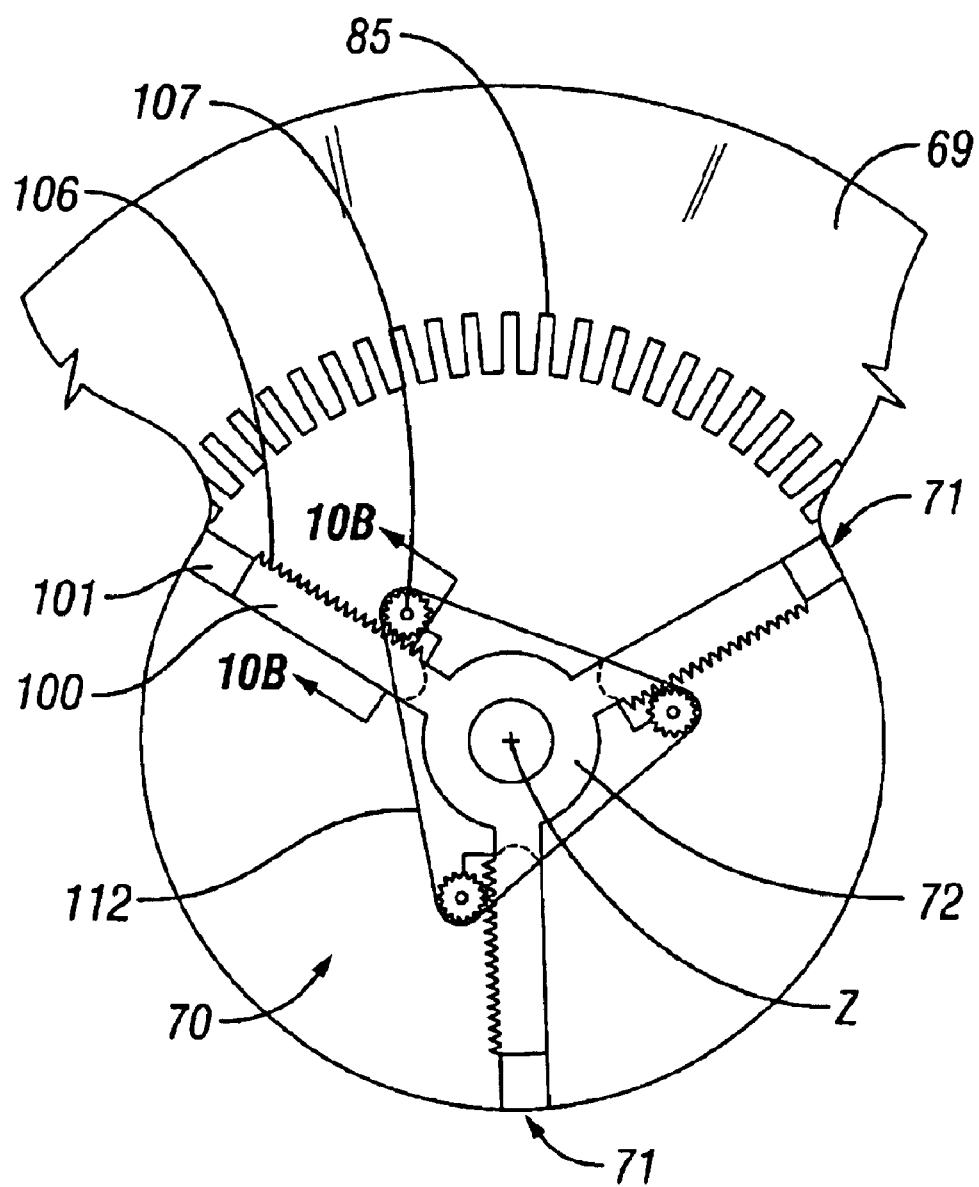
FIG. 10A is a partial, enlarged, end view of an alternative embodiment of the custom cleaning head the jig components of the apparatus shown in FIG. 8.

Alternatively, the jig 70 may utilize notched pulleys and a notched belt, as seen in FIGS. 10A and 10B. This alternative version of jig 70 functions in a manner very similar to the version of FIGS. 9A and 9B, except that the ring rear 104 is replaced with an endless, looped gearbelt 112, and a pulley 113 is substituted for each drive gear 110. The belt 112 engages a pulley 113, which is fixed to a shaft 109 so as to drive a pinion gear 107. Accordingly, when the gearbelt 112 is driven, it imparts rotary motion to the pinion gear 107 to cause the movable segment 101 of each of the spokes 71, 71', 71" to translate radially. In either jig configuration, there is provided a rack 106 and pinion 107 for converting rotary motion to linear motion on each spoke 71 of the jig 70, as illustrated with combined reference to FIGS. 9A, 9B, 10A and 10B.

Accordingly, with the distal end 103 of each spoke 71 engageable with the stack 69, the jig 70 can chuck up against either the inside or outside rim of the proximate end of the core iron stack. For especially long stators, it may be necessary to clean the stack slots in two steps, i.e., cleaning one half the axial length first, then repositioning the jig 70 to clean the other half. In such an instance of usage, the chuck may be mounted on the end rim of the stator, and the second (side) chuck self-centers against the inside of the core iron stack 69. In either approach, the arrangement and operation of the apparatus permit the stack slots to be cleaned completely to both ends of the stack 69.

Figure 11A:
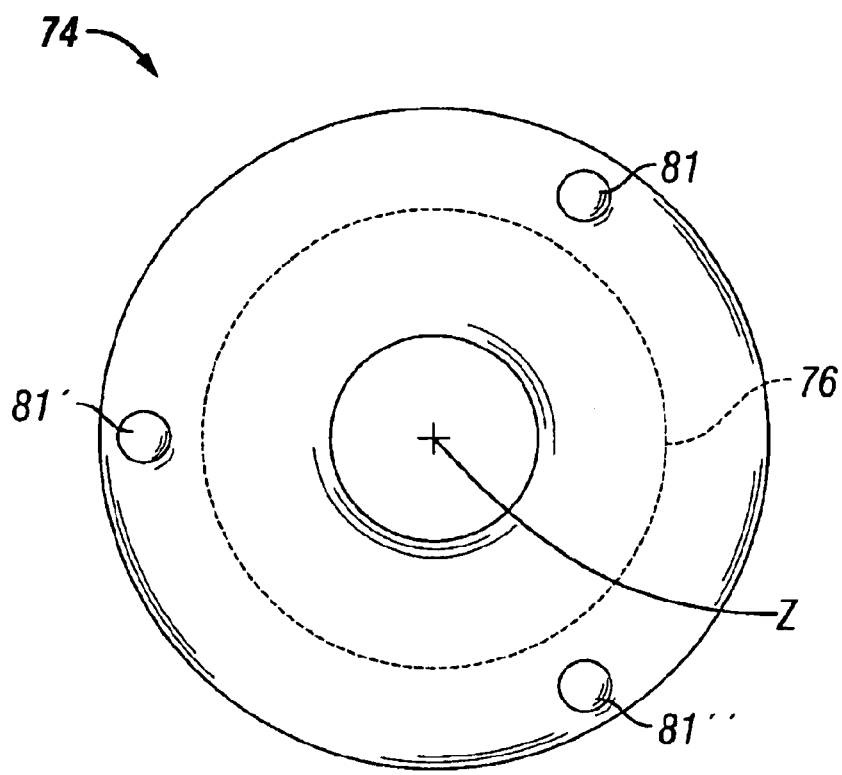
FIG. 11A is an end view of the lazy-susan component of the custom cleaning head according to the invention.
Figure 11B:
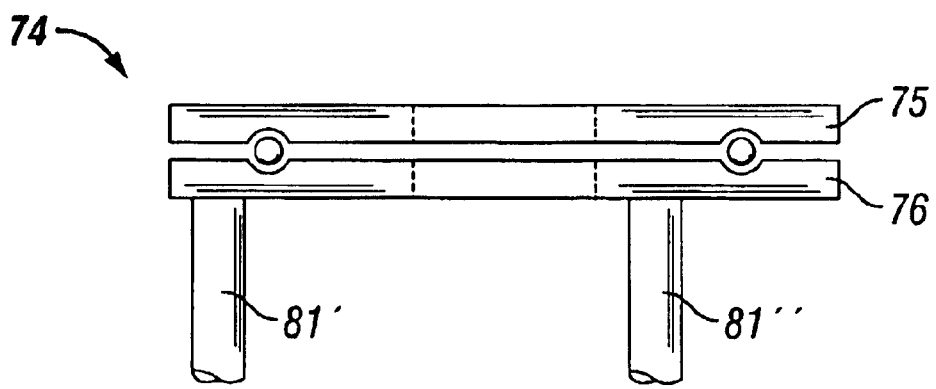
FIG. 11B is a top view of the lazy-susan component, shown in FIG. 11A, of the custom cleaning head according to the present invention.

Further description of this "slot-cleaning" embodiment of the inventive apparatus is had with reference to FIGS. 11A and 11B. A simple lazy-susan assembly 74 is attached to the centering jig 70. The fixed base plate 75 of the lazy-susan 74 is mounted to the central portion 72 (not to the extendable spokes 71, 71', 71") of the jig 70, so to be non-rotatable relative to the jig. The inner plate 76 is rotatable parallel to and in relation to the fixed base plate 75, as with interposed ball bearings and races, so that the inner plate 76 can rotate freely, around the stack axis Z, in relation to the jig 70. Such an arranged assembly is duplicated for the second identical jig (not shown) likewise attached to the distal end of the stack 69, such that the two lazy susan assemblies'respective rotating inner plates 76 are facing axially inward, facing one another along the axis Z. A means is provided for releasably interconnecting the inner plate 76 and base plate 75, so as to secure the inner plate 76 against rotation around the axis Z. When the interconnecting means is disengaged, the inner plate 76 is free to spin on its axis.

Figure 12:
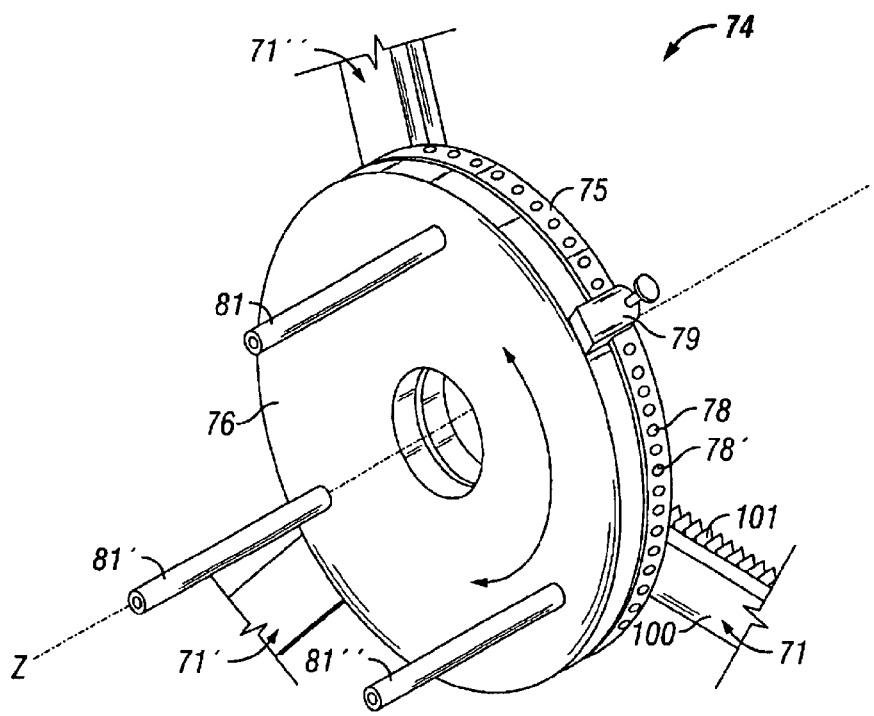
FIG. 12 is a perspective view a the operatively joined lazy-susan and jig components of the custom cleaning head of the present invention, positioned for use to clean the interior slots of the interior slots of an electrical generator iron core stack as seen in FIGS. 8 and 9A.

For example of a releasable interconnecting means, as seen in FIG. 12, one or both fixed base plates 75 preferably is provided with indexing detents 78, 78' uniformly arrayed around its circumferential perimeter. The number of detents 78, 78' corresponds to the number of slots in the iron core stack 69. A suitable latch mechanism 79, for example a large set screw, is selectively engageable with, and disengageable from, any one of the detents 78, 78'. (Of course, the configuration may be reversed, with the detents on the inner plate and the latch mechanism on the fixed base plate 75).

In operation, the apparatus is assembled and initiated to clean one stack slot at a time, either from end-to-end of the stack 69, or halfway down the length of the slot, depending on the overall length of the stack. The apparatus is then adjusted, by releasing and rotating the inner portions 76 of the lazy susan assemblies 74, to position the apparatus to clean the next circumferentially adjacent slot 85. The process is repeated until the all the axial slots in the stack 69 are cleaned.

Continued reference is made to FIG. 12. The respective rotating portions 76 of the pair of jigs 70 are connected by rails 81, 81', 81" extending there-between. For purposes of illustration only, three rails 81, 81', 81" are depicted in FIG. 12, but the number is by example and not limitation, as the number of rails 81, 81' depends upon the axial length of the stack 69, the load weight of the optical box (described below), and allowable flexure. The rails 81, 81' may be fashioned from solid rods, rigid pipe, small-I-beams, or the like. The material of the rails 81, 81 ' preferably has a high strength-to-weight ratio and low coefficient of thermal expansion.

Figure 13A:
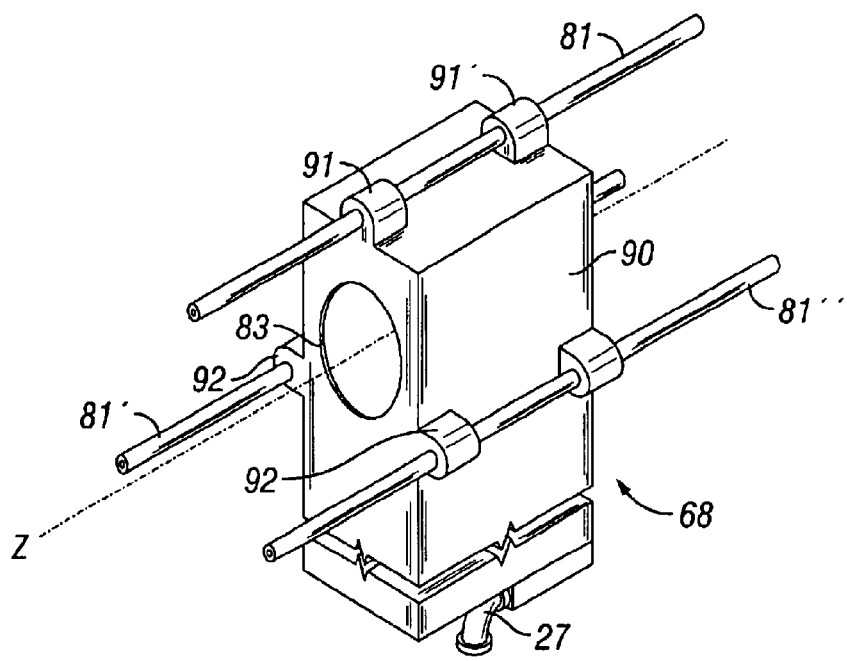
FIG. 13A is a perspective view of an upper portion of the optical box carriage of the custom cleaning head of the present invention, which carriage in use moves axially within the interior of an electrical generator iron core stack as seen in FIGS. 8 and 9A.
Figure 13B:
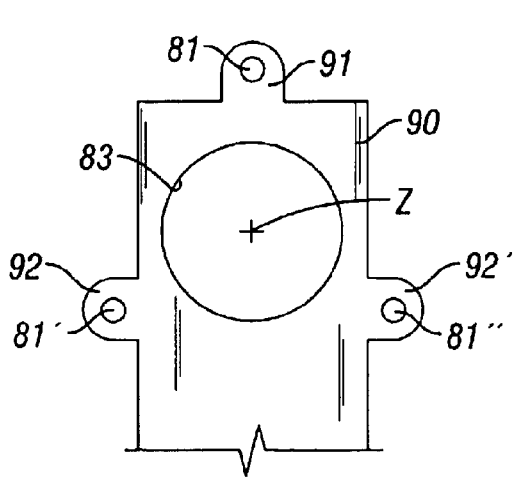
FIG. 13B is a partial end view of the optical box carriage shown in FIG. 13A.
Figure 13C:
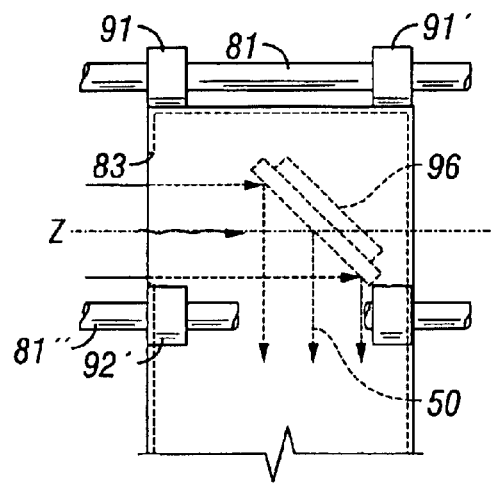
FIG. 13C is a partial side view, in partial cross section, of the optical box carriage shown in FIG. 13A.

A carriage 90, including primarily an optics box, is axially movable along the axis Z by "riding" on the rails 81, 81', 81", as indicated in FIGS. 13A–C. A motor-driven screw drive, or motor-driven cable and pulleys assembly, motivates the carriage 90 to travel along the axis Z. For example, the top rail 81 may be threaded, and have screwed engagement with correspondingly threaded cases 91, 91' on carriage 90; powered rotation of the top rail 81 accordingly moves the carriage 90 axially, as indicated by the directional arrows of FIG. 13A. Alternatively, the carriage 90 may be motivated by any suitable cable or gearbelt drive known generally. Movement of the carriage 90 is directed and stabilized by means of mounts 92, 92' on carriage, slidably engaged with other rails 81', 81" (e.g. lubricated sliding engagement, or roller bearing contacts), so that the carriage 90 is free to translate along axis Z, but cannot shift radially in relation thereto. The drive motor speed is variable to permit the operator to set the appropriate z-axis travel scan speed. The means for motivating the carriage 90 (e.g. screw drive, cable drive) as well as the drive motor speed, are be finely tuned to allow the operator to closely control the carriage's axial position and speed.

Figure 14:
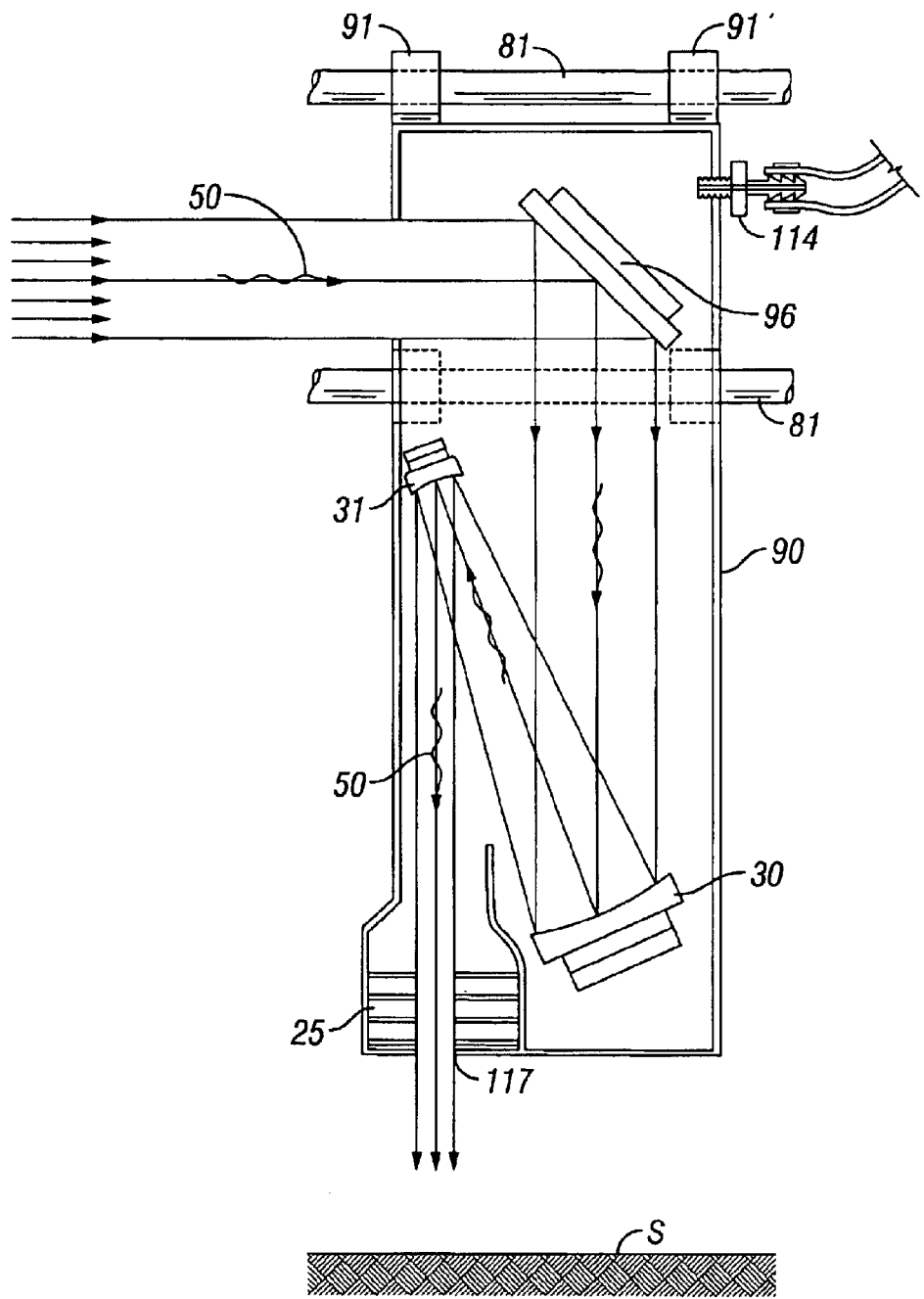
FIG. 14 is an enlarged side sectional view of the optical box depicted in FIGS. 13A–C.

As seen in FIGS. 13A–C and 14, the laser beam 50 reflected from the axial launch mirror in the final knuckle 67' is transmitted along the stack axis Z; the carriage 68, which travels along the axis Z, at all times is positioned so that the laser beam 50 is incident thereon, specifically received into the beam entry port 83 (FIGS. 13A–C). Disposed in the optics box 90 of the carriage 68 is a turning (e.g. 90-degree) mirror 96 that reflects the laser beam 50 perpendicular to axis Z, thereby directing the beam 50 radially outward toward the slotted inside face S of the core stack 69, as illustrated in FIG. 14. After reflecting from turning mirror 96, the beam 50 enters an optical assembly for beam shaping by means of first mirror 30 and second, final mirror 31 (see also FIG. 4). Upon exiting the optics box 90, the beam 50 is directed down into a slot in the core iron. The final, beam-shaping mirror 31 in the carriage optics box 90 may be cross-axis dithered slightly to achieve a to-and-fro motion to the beam 50 while the carriage 68 is moving axially, as suggested by combined reference to FIGS. 13A, and 14. The first mirror 30 maybe a 1-D (cylindrical) or 2-D (spheric) mirror to accomplish beam compression according to the application. Preferably, the laser beam parameters are selected so that most of the beam 50 repeatedly reflects from the sides of any given slot 85 toward the bottom of the slot, cleaning the sides as it so progresses, until the beam reaches and cleans the slot bottom.

In the cleaning of deep narrow slots, the penetration depth through the contaminant or other coating at an oblique angle is longer than the perpendicular penetration depth, such as that encountered at the bottom of a slot. Thus, dithering the beam 50 to-and-fro with respect to the Z axis, the angular velocity of the beam can be momentarily increased when the beam is sweeping across the bottom of a slot.

A positive pressure source 114 of chilled clean air or inert gas pressurizes the interior of the optics box 90. The custom work head 60 (FIG. 6) comprised of the carriage 68 and associated components injects compressed air into a slot 85 from one side, i.e., the just-cleaned side, of the area being cleaned. The stack slot serves as an airflow guide; a debris-capture suction nozzle (not shown, similar to nozzle 97 of FIGS. 3A–C) attached to the carriage 68 collects the ablated material entrained in the air flow. The nozzle may be attached to the carriage 68 to travel the in the direction of the Z axis concurrently with the beam port 117. A given custom work head 60 alternatively may incorporate a pair of air injectors and vacuum nozzles, directed in opposing directions, to permit either of the alternative pairs for debris removal depending upon the axial direction the custom work head 60 is moving.

Laser ablation theory is based mainly on thermal chemistry, resulting in a parameter called $Q^*$, equaling the joules of energy needed per gram of coating material to cause the coating material to quickly go from a solid, through liquid phase, to vapor phase. In laser ablation, the phase changes happen so fast that the intermediate liquid phase is essentially indiscernible. Conventional laser ablation theory does not explain, however, certain experimental results observed by the applicants in which apparent cleaning speeds have been significantly higher that the $Q^*$ calculation would predict.

The present invention exploits the following processes in the application of industrial-speed laser ablation: (1) New Strong-field STARK effect to shift excited states into resonance; and (2) New Stimulated Raman amplification in laser-ablation plasma plume.

Laser ablation has traditionally been viewed as a fast thermal (heating) process with LTE (local thermal equilibrium), resulting in quasi-Maxwellian distributions and thermal processes. This is analogous to rapidly heating ice directly to vapor (phase change) and bypassing the liquid phase, and some chemical reactions if certain chemicals are present. The present invention is based in part upon a determination that the total process is more complicated, that direct bond breaking from photons interacting with hydrocarbon-based molecules also contributes significantly to the process under the right conditions. Laser ablation is not just normal 'thermal' chemistry.

Most materials that are solid at standard temperature will undergo a phase change to liquid when heated. Each material has a melting temperature at normal atmospheric pressure. If the pressure is raised, the melting temperature increases, and visa-versa. With additional increase in temperature, the liquid vaporizes into a gas. Thus, most solids at standard pressure change from a solid, to liquid, and then to a gas when heated—three phases or states of matter.

In laser ablation, energy is introduced to a material so rapidly that a solid material undergoes a phase change directly to the gas/vapor state, and the gas is even partially ionized. The ablated material is so hot that it literally is physically propelled from the material surface in small "explosions." In laser ablation, initial temperature of the ablated material is about 20,000 degrees F. Thus, in ablation the liquid phase is effectively skipped—the ablated material sublimates from solid directly to ionized gas.

As a general rule, about 0.5 milligrams of material is ablated for each joule of energy provided. The precise amount varies depending on the character of the material ablated, e.g. lead-based metallic paint versus simple graffiti paint. In any case, it is important that the energy be provided very quickly; if it is deposited slowly, there is time for unproductive heat transfer deeper into the coating, or even into the substrate. Such energy dissipates, and the target material doesn't get hot enough for efficient ablation. For ablation, the energy needs to be deposited within a few millionths of a second or less, and it needs to be deposited with a certain intensity (fluence), typically at least 5 joules per square centimeter, if not higher (depending on the coating material). When the ablation is done right, the solid coating material quickly becomes a partly ionized gas, and explodes off of the surface before there is any noticeable heat transfer away from the region being ablated.

Another mechanism is at work in laser ablation, however, which is introduced here with a simple description of how a basic microwave oven works. All food contains some water molecules. A microwave oven emits radiation which penetrates the food. The frequency of the radiation is substantially the same as the vibrational frequency of the bonds that attach the hydrogen atoms to the oxygen atom in the water molecules. With the microwave energy wave-radiation frequency in resonance with the molecule's bonding vibrational frequency, the hydrogen atoms vibrate further and faster in relation to the oxygen atom. The energy of the vibrating water molecules generates frictional heating in the food.

In the laser ablation of the present invention, it is understood that energy is supplied to the target material at such a rate that the vibrational energy of atoms is boosted to the point of breaking molecular bonds. The notion of using lasers to break molecular bonds was explored for use in uranium enrichment, but is a concept previously foreign to laser ablation techniques. The present invention applies the basic photophysics of laser-based molecular destruction to exploit the concepts for laser ablation of hydrocarbon molecules in solid coatings.

Metallic materials generally have lattice structures. The vibrational frequencies in such lattice structures are higher frequencies that in free molecules. Radiation from excimer lasers emitting (lasing) in the ultraviolet energy range are in general resonance with metallic lattice vibrational frequencies. In the present invention, photochemistry, is used to modify molecules, particularly in tearing apart poly-atomic molecules for enhancing laser ablation processes.

Figure 15A:
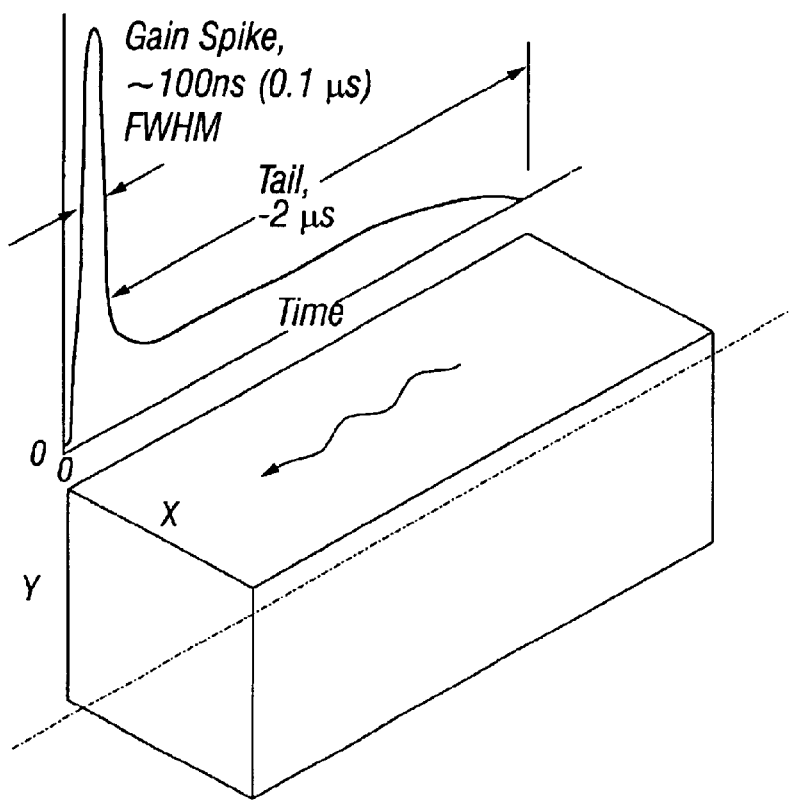
FIGS. 15A–C are graphical representations of the power density characteristics of a pulsed CO2 laser, known in the art.

The invention may be practiced using carbon dioxide (CO2) TEA lasers. Such TEA lasers have an energy-vs-time profile as shown in FIG. 15A. Half of the energy output is in the front-end "gain spike" lasting about 100 nanoseconds or less, and the other half is in the long "tail" lasting about 2 microseconds. Thus, in the first approximately 100 nanoseconds, the photon flux (photons per $cm^2$ per second) is enormous, enabling infrared multi-photon molecular dissociation.

Figure 15B:
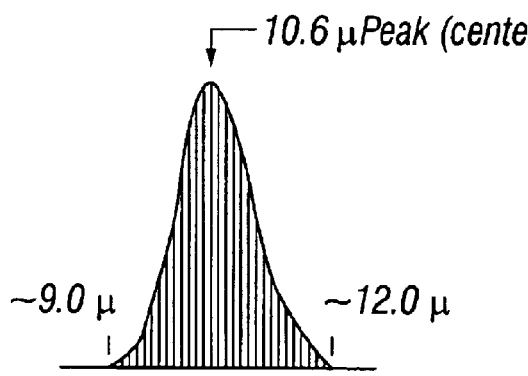
Figure 15C:
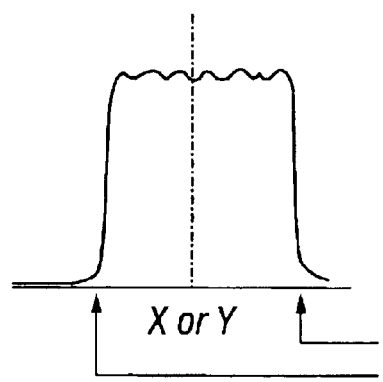

Though the CO2 laser has a peak output at 10.6 microns wavelength, it actually has "shoulders" around the peak from about 9.0 microns to 12.0 microns to define a rather narrow bell-shaped curve, as suggested in FIG. 15B. Unlike crystal lasers, where spatial power measurements taken across the (round) beam is bell shaped, in a TEA laser the energy profile across the (square or rectangular) beam is "flat-topped," as observed in FIG. 15C.

From the foregoing, it could be inferred that the laser radiation must be exactly in resonance with the molecular bond frequencies. The resonant wavelengths for various bonds are given in FIG. 16. Bond frequencies for various forms of iron oxide (rust) fall in this same region, and the inventive process has successfully been used for rust removal.

Referring to FIG. 15B, the "shoulders" around 10.5 microns (fine structure=many secondary transition lines, not a continuum bell-shaped curve) cover most of bond resonances. It was formerly believed that though there is less energy in the "shoulder" lines, weak coupling drove a non-linear process that resulted in stronger coupling. This is only partly true.

If the electric field of the laser beam is weak, then one has to rely on "in-band" coupling between the laser-light frequency and molecular resonant frequency. However, if the electric field is strong, it dominates, and a 2-step process ensues:

1) The intense electric field results in the "Stark effect" or Stark-broadened resonances. The molecular vibrational frequency is forced to change and become in resonance with the laser frequency.
2) Then, with stronger "in-band" resonance, plus Infrared Multi-photon Molecular Dissociation, the bonds are more efficiently broken.

The discoverers of this were chemists interested in selective bond breaking (or new bending) to be able to control chemical processes in producing new polyatomic molecule products. The applications of the present invention are quite different, i.e., completely tear the molecule apart, such that the dissociated atoms recombine into simple by-products like CO2 and H2O. The invention exploits the above 2-step process.

The principles of stimulated Raman scattering for beam amplification apply in gas cells and plasmas, and advantageously for laser ablation as well. Reference is again made to FIG. 15A showing the energy profile for a TEA laser. It is believed that the "gain spike" does the bulk of the work in ablating the material, taking it from ambient temperature to an ionized gas (plasma) at about 20,000 degrees Fahrenheit.

The very hot ablated material "explodes" off of the target surface, as in a hemispherical explosion or blast wave. Initially, the plasma cloud (or plume) shields the energy "tail" or the laser beam from reaching the surface, but that energy couples into the plasma plume itself, resulting in "plume material processing." Some of the energy tail can be back-reflected into the beam, causing Raman amplification, which in turn increases the forward photon flux, promoting infrared multi-photon molecular dissociation.

As the plasma cloud expands, its density drops and more of the incoming beam again penetrates deeper into the cloud, if not through it, and some back-reflection from the surface again causing Raman amplification, again increasing forward photon flux.

The invention harnesses, therefore, stimulated Raman scattering and laser-beam amplification in the plasma plume in efficient laser ablation.

The invention includes the following elements, individually and in combinations to high-power laser ablation of di- tri- and poly-atom molecules in coating materials: (1) Stark-broadened resonances; (2) Infrared Multi-photon Molecular Dissociation; and (3) Inverse Raman scattering for laser-beam amplification in the ablation plume.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for performing laser ablation cleaning of a surface, the apparatus comprising:
   a laser source for generating a laser beam;
   a beam delivery system for transmitting the beam from said source to a workhead; and
   a workhead comprising:
   an optical box having a beam entrance and a beam exit and enclosing an interior containing a first mirror and a second mirror for directing said beam from said entrance toward the surface;
   means for positively pressurizing the interior of said optical box to induce an air stream out said beam exit; and
   a vacuum nozzle adjacent said beam exit, said nozzle in fluid communication with a vacuum unit for providing negative pressure in said nozzle to induce an airflow through said nozzle;
   wherein material ablated from the surface is entrained into said airflow in said nozzle.

2. An apparatus according to claim 1 wherein said laser source is a pulse repetition laser.

3. An apparatus according to claim 1 wherein said beam is broad upon entrance into said optical box and said second mirror focuses said beam, whereby the energy density of said beam is increased by passage through said optical box.

4. An apparatus according to claim 1 further comprising a baffle disposed at said exit to minimize the entry of ablated material into said optical box while permitting the transmission of said beam from said exit.

5. An apparatus according to claim 1 wherein said workhead is hand-led and further comprises a triggered gun housing for containing said optical box.

6. An apparatus according to claim 1 wherein the surface to be cleaned is a slot in a core stack of an electrical generator, the stack having a longitudinal axis, and the apparatus further comprising:
   an axial launch mirror for directing said laser beam from said laser source down the longitudinal axis of the core of the stack;
   at least one adjustable jig assembly, releasably attachable to the core iron stack, for fixing said launch mirror upon the longitudinal axis;
   at least one carriage rail disposable axially within the core of the stack;
   means for rotatably mounting said rail to said jig assembly; and
   a carriage, mounting said workhead including said optical box and nozzle, said carriage movable along said at least one rail for selective axial positioning of said carriage on the longitudinal axis within said core;
   wherein said carriage is controllably rotatable in relation to the longitudinal axis to radially said beam exit with the slot thereby to direct said laser beam toward said slot.

7. An apparatus according to claim 6 wherein said jig assembly comprises a central hub and at least two spokes extending radially from said hub, said spokes having adjustable lengths.

8. An apparatus according to claim 7 wherein said jig assembly comprises three uniformly spaced spokes.

9. An apparatus according to claim 8 further comprising means for uniformly adjusting the lengths of said three spokes, thereby to position said axial launch mirror and said carriage on the longitudinal axis of stacks of differing diameters.

10. An apparatus according to claim 9 wherein said second mirror is dithered for controlled to-and-fro pivoting.

11. A system for performing laser ablation cleaning of a surface, the system comprising:
    a laser source for generating a laser beam, said source including a laser dust-reject subsystem;
    a beam delivery system for transmitting the beam from said source to a workhead; and
    a workhead comprising:
    an optical box having a beam entrance and a beam exit and enclosing an interior containing a first mirror and a second mirror for directing said beam from said entrance toward the surface;
    means for positively pressurizing the interior of said optical box to induce an air stream out said beam exit; and
    a vacuum nozzle adjacent said beam exit, said nozzle in fluid communication with a vacuum unit for providing negative pressure in said nozzle to induce an airflow through said nozzle;
    wherein said workhead is hand-led and further comprises a triggered gun housing for containing said optical box, and further wherein material ablated from the surface is entrained into said airflow in said nozzle.

12. A system according to claim 11 wherein said laser source is a pulse repetition laser.

13. A system according to claim 12 wherein said laser is a $CO_2$ laser.

14. A system according to claim 12 wherein said beam is broad upon entrance into said optical box and said second mirror focuses said beam, whereby the energy density of said beam is increased by passage through said optical box.

15. An apparatus according to claim 14 further comprising a baffle disposed at said exit to minimize the entry of ablated material into said optical box while permitting the transmission of said beam from said exit.

16. A system for laser ablation cleaning of a slot in a core stack of an electrical generator, the stack having a longitudinal axis, the system comprising:
    a laser source for generating a laser beam;
    a beam delivery system for transmitting the beam from said source to a workhead; and
    a workhead comprising:
    an optical box having a beam entrance and a beam exit and enclosing an interior containing a first mirror and a second mirror for directing said beam from said entrance toward the surface;
    means for positively pressurizing the interior of said optical box to induce an air stream out said beam exit; and
    a vacuum nozzle adjacent said beam exit, said nozzle in fluid communication with a vacuum unit for providing negative pressure in said nozzle to induce an airflow through said nozzle;
    an axial launch mirror for directing said laser beam from said laser source down the longitudinal axis of the core of the stack;
    at least one adjustable jig assembly, releasably attachable to the core iron stack, for fixing said launch mirror upon the longitudinal axis;
    at least one carriage rail disposable axially within the core of the stack;
    means for rotatably mounting said rail to said jig assembly; and
    a carriage, mounting said workhead including said optical box and nozzle, said carriage movable along said at least one rail for selective axial positioning of said carriage on the longitudinal axis within said core;

wherein said carriage is controllably rotatable in relation to the longitudinal axis to radially said beam exit with the slot thereby to direct said laser beam toward said slot, and wherein material ablated from the surface is entrained into said airflow in said nozzle.

17. A system according to claim 16 wherein said jig assembly comprises a central hub and at least two spokes extending radially from said hub, said spokes having adjustable lengths.

18. A system according to claim 17 wherein said jig assembly comprises three uniformly spaced spokes.

19. A system according to claim 18 further comprising means for uniformly adjusting the lengths of said three spokes, thereby to position said axial launch mirror and said carriage on the longitudinal axis of stacks of differing diameters.

20. A system according to claim 19 wherein said means for uniformly adjusting comprises:

a rotatable ring gear;

pinion gears, corresponding in number to said spokes, in operative connection with said ring gear; and a toothed rack on a movable segment of each of said spokes and engaged with said pinion gear;

wherein rotary motion of said ring gear causes said pinion gears to rotate thereby uniformly moving said movable segments of said spokes.

21. A system according to claim 19 wherein said means for uniformly adjusting comprises:

an endless gearbelt;

pinion gears, corresponding in number to said spokes, in operative connection with said gearbelt; and a toothed rack on a segment of each of said spokes and engaged with said pinion gear;

wherein movement of said gearbelt causes said pinion gears to rotate thereby uniformly moving said movable segments of said spokes.

22. A system according to claim 16 wherein said second mirror is dithered for controlled to-and-fro pivoting.

* * * * *